United States Patent
Uchiyama

(10) Patent No.: US 9,260,602 B2
(45) Date of Patent: Feb. 16, 2016

(54) ANTISTATIC FLAME RETARDANT RESIN COMPOSITIONS AND METHODS AND USES THEREOF

(71) Applicant: SABIC Global Technologies B.V., Bergen op Zoom (NL)

(72) Inventor: Tatsuya Uchiyama, Tochigi (JP)

(73) Assignee: SABIC Global Technologies B.V., Bergen op Zoom (NL)

( * ) Notice: Subject to any disclaimer, the term of this patent is extended or adjusted under 35 U.S.C. 154(b) by 0 days.

(21) Appl. No.: 13/649,750

(22) Filed: Oct. 11, 2012

(65) Prior Publication Data
US 2014/0107266 A1    Apr. 17, 2014

(51) Int. Cl.
*C08L 69/00*    (2006.01)
*C08L 83/10*    (2006.01)

(52) U.S. Cl.
CPC ........................... *C08L 69/00* (2013.01)

(58) Field of Classification Search
CPC ................... C08L 83/10; C08L 69/00
See application file for complete search history.

(56) References Cited

U.S. PATENT DOCUMENTS

| | | | |
|---|---|---|---|
| 4,038,258 A | 7/1977 | Singh et al. | |
| 4,115,475 A | 9/1978 | Foy et al. | |
| 4,195,015 A | 3/1980 | Deleens et al. | |
| 4,217,438 A | 8/1980 | Brunelle et al. | |
| 4,230,838 A | 10/1980 | Foy et al. | |
| 4,254,775 A | 3/1981 | Langer | |
| 4,331,786 A | 5/1982 | Foy et al. | |
| 4,332,920 A | 6/1982 | Foy et al. | |
| 4,537,596 A | 8/1985 | Muller et al. | |
| 4,746,701 A | 5/1988 | Kress et al. | |
| 4,839,441 A | 6/1989 | Cuzin et al. | |
| 4,864,014 A | 9/1989 | Cuzin et al. | |
| 5,112,940 A | 5/1992 | Korte | |
| 5,159,053 A | 10/1992 | Kolycheck et al. | |
| 5,604,284 A | 2/1997 | Ueda et al. | |
| 5,652,326 A | 7/1997 | Ueda et al. | |
| 5,840,807 A | 11/1998 | Frey et al. | |
| 5,863,466 A | 1/1999 | Mor | |
| 5,886,098 A | 3/1999 | Ueda et al. | |
| 6,827,882 B1 | 12/2004 | Kitayama et al. | |
| 6,995,211 B2 | 2/2006 | Nodera et al. | |
| 7,018,567 B2 * | 3/2006 | Murray | 252/511 |
| 7,498,401 B2 * | 3/2009 | Agarwal | 528/201 |
| 8,017,567 B2 | 9/2011 | Schmit et al. | |
| 8,039,535 B2 | 10/2011 | Lee et al. | |
| 2008/0029744 A1 * | 2/2008 | Jansen et al. | 252/601 |
| 2009/0306258 A1 * | 12/2009 | Siripurapu et al. | 524/147 |
| 2011/0028615 A1 | 2/2011 | Li et al. | |

FOREIGN PATENT DOCUMENTS

| | | |
|---|---|---|
| GB | 2043083 A | 10/1980 |
| WO | WO 2006/041762 | 4/2006 |
| WO | WO 2008/002723 | 1/2008 |

OTHER PUBLICATIONS

Aicello (Antistatic Property. Aicello. 2014. 1 page).*
Sanyo Chemical Industries, "Performance Chemicals for Synthetic Resin & Rubber Industries and Paint, Ink & Pigment Industries," Chemical Product Outline, pp. 1-8, Feb. 2012.
Talley, J. (1988) Preparation of sterically hindered phosphoramidates. J. Chem. Eng. Data, 33: 221-222.
Patentability Search Report dated Jun. 25, 2012 pp. 1-11.

* cited by examiner

*Primary Examiner* — Brieann R Fink
(74) *Attorney, Agent, or Firm* — Baker Hostetler LLP

(57) ABSTRACT

Disclosed herein are compositions comprising polycarbonate-polysiloxane copolymer, polycarbonate, flame retardant additive, and an anti-static agent. Also disclosed are materials and devices made thereof. This abstract is intended as a scanning tool for purposes of searching in the particular art and is not intended to be limiting of the present invention.

16 Claims, No Drawings

ANTISTATIC FLAME RETARDANT RESIN COMPOSITIONS AND METHODS AND USES THEREOF

FIELD OF INVENTION

The present disclosure relates to compositions comprising a polycarbonate-polysiloxane copolymer, a polycarbonate, an anti-static agent, and a flame retardant additive, and articles of manufacture made therefrom.

BACKGROUND

Polymeric compositions are suitable for a large number of applications because of their high strength-to-weight ratio and ease of processing. Desired properties of such materials include high impact strength, desired anti-static performance, and desired flammability performance. However, polymer compositions can have build-up of electrostatic charges in the polymeric resin which attracts dust and foreign particles, thereby spoiling the appearance of molded parts made therefrom. Moreover, the buildup of electrostatic charges renders the polymeric resin unusable in certain electrical and electronic applications. It is therefore desirable to have polymeric resins that possess antistatic properties (i.e., are electrostatically conductive) and while maintaining high impact strength and desired flammability performance.

Thus, there is a need for materials with the desired properties discussed above. Such compositions, materials and articles of manufacture with the compositions are disclosed herein.

SUMMARY

In accordance with the purpose(s) of the invention, as embodied and broadly described herein, this disclosure, in one aspect, relates to compositions comprising a polycarbonate-polysiloxane copolymer, a polycarbonate, an anti-static agent, and a flame retardant additive. Also disclosed are methods of making the compositions described herein. Also disclosed are articles of manufacture comprising the disclosed compositions.

Disclosed herein is a composition comprising: a) a polycarbonate-polysiloxane copolymer, wherein the siloxane is present in the copolymer in an amount of about 8% by weight to about 50% by weight, and wherein the siloxane is present in the composition in an amount of about 0.8% by weight to about 9% by weight; b) a polycarbonate; c) an anti-static agent; and d) a flame retardant additive. For example, the polycarbonate can be present in an about of about 10% by weight to about 90% by weight; the polycarbonate-polysiloxane copolymer can be present in an amount of about 3% by weight to about 50% by weight; the anti-static agent can be present in an amount of about 4% by weight to about 19% by weight; and the flame retardant additive can be present in an amount of above 0% to about 30% by weight on the composition.

The compositions can further comprise an anti-oxidant, a mold release agent, a filler or an anti-drip agent, or a mixture thereof.

Also disclosed are methods of making the described compositions and articles of manufacture comprising the described compositions.

DESCRIPTION

The present invention can be understood more readily by reference to the following detailed description of the invention and the Examples included therein.

Before the present compounds, compositions, articles, systems, devices, and/or methods are disclosed and described, it is to be understood that they are not limited to specific synthetic methods unless otherwise specified, or to particular reagents unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited.

A. Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, example methods and materials are now described.

As used in the specification and the appended claims, the singular forms "a," "an" and "the" include plural referents unless the context clearly dictates otherwise. Thus, for example, reference to "a nanocomposite" includes mixtures of two or more nanocomposites, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "optional" or "optionally" means that the subsequently described event or circumstance can or cannot occur, and that the description includes instances where said event or circumstance occurs and instances where it does not.

As used herein, the term "effective amount" refers to an amount that is sufficient to achieve the desired modification of a physical property of the composition or material. For example, an "effective amount" of a flame retardant additive refers to an amount that is sufficient to achieve the desired property associated with the flame retardant additive and the like. The specific level in terms of wt % in a composition required as an effective amount will depend upon a variety of factors including the amount and type of flame retardant additive, amount and type of thermoplastic polyimide, and polyamide.

As used herein, the term "siloxane" refers to the chemical moiety —Si(R)$_2$—O—. The phrase "siloxane is present in the copolymer in an amount of about X % by weight" refers to the weight of the —Si—O— moiety excluding the R groups. For example, in the moiety —Si(Me)$_2$—O— the siloxane is present in an amount of about 59.5% ((Si+O)/(Si+O+C+C+6H)=59.5% i.e. (28+16)/(28+16+12+12+6)=0.5945).

As used herein, the term "about X %" or the like terms refer to ±0.5% within the value of X. For example, about 10% refers to 9.5%-10.5%. The term "about 0. X %" or the like terms refer to ±0.05% within the value of X. For example, about 0.8% refers to 0.75%-0.85%.

The notched IZOD parameter disclosed herein refers to a notched IZOD parameter determined by the ASTM D256 method at 23° C. at a 50% humidity.

The term "TSAN" or the like terms refer to a blend of polytetrafluoroethylene (PTFE) and styrene acrylonitrile (SAN). The blend can be a 1:1 blend. TSAN can be an anti-drip agent.

The term "antistatic agent" or the like terms refer to several materials that can be either melt-processed into polymeric resins or sprayed onto commercially available polymeric forms and shapes to improve conductive properties and overall physical performance.

The antistatic performance discuss herein in terms of the half life time is determined by measurements performed by the JIS L 1094 standard. A discharge voltage is 9.0 KV at 23° C. at a 50% humidity is used. The compositions are measured after 6 hrs aging at the same conditions as the initial measurement. A lower half life time indicates a better antistatic performance.

As used herein, the term "flame retardant additive" or the like terms refer to a material that prevent, delay, or inhibit spreading of fire. Incorporating a flame retardant additive in compositions can reduce the flammability.

As used herein, the term "substituted" is contemplated to include all permissible substituents of organic compounds. In a broad aspect, the permissible substituents include acyclic and cyclic, branched and unbranched, carbocyclic and heterocyclic, and aromatic and nonaromatic substituents of organic compounds. Illustrative substituents include, for example, those described below. The permissible substituents can be one or more and the same or different for appropriate organic compounds. For purposes of this disclosure, the heteroatoms, such as nitrogen, can have hydrogen substituents and/or any permissible substituents of organic compounds described herein which satisfy the valences of the heteroatoms. This disclosure is not intended to be limited in any manner by the permissible substituents of organic compounds. Also, the terms "substitution" or "substituted with" include the implicit proviso that such substitution is in accordance with permitted valence of the substituted atom and the substituent, and that the substitution results in a stable compound, e.g., a compound that does not spontaneously undergo transformation such as by rearrangement, cyclization, elimination, etc. It is also contemplated that, in certain aspects, unless expressly indicated to the contrary, individual substituents can be further optionally substituted (i.e., further substituted or unsubstituted).

In defining various terms, "$A^1$," "$A^2$," "$A^3$", and "$A^4$" are used herein as generic symbols to represent various specific substituents. These symbols can be any substituent, not limited to those disclosed herein, and when they are defined to be certain substituents in one instance, they can, in another instance, be defined as some other substituents.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

This practice is also used for other groups described herein. That is, while a term such as "cycloalkyl" refers to both unsubstituted and substituted cycloalkyl moieties, the substituted moieties can, in addition, be specifically identified herein; for example, a particular substituted cycloalkyl can be referred to as, e.g., an "alkylcycloalkyl." Similarly, a substituted alkoxy can be specifically referred to as, e.g., a "halogenated alkoxy," a particular substituted alkenyl can be, e.g., an "alkenylalcohol," and the like. Again, the practice of using a general term, such as "cycloalkyl," and a specific term, such as "alkylcycloalkyl," is not meant to imply that the general term does not also include the specific term.

The term "cycloalkyl" as used herein is a non-aromatic carbon-based ring composed of at least three carbon atoms. Examples of cycloalkyl groups include, but are not limited to, cyclopropyl, cyclobutyl, cyclopentyl, cyclohexyl, norbornyl, and the like. The term "heterocycloalkyl" is a type of cycloalkyl group as defined above, and is included within the meaning of the term "cycloalkyl," where at least one of the carbon atoms of the ring is replaced with a heteroatom such as, but not limited to, nitrogen, oxygen, sulfur, or phosphorus. The cycloalkyl group and heterocycloalkyl group can be substituted or unsubstituted. The cycloalkyl group and heterocycloalkyl group can be substituted with one or more groups including, but not limited to, alkyl, cycloalkyl, alkoxy, amino, ether, halide, hydroxy, nitro, silyl, sulfo-oxo, or thiol as described herein.

The term "polyalkylene group" as used herein is a group having two or more $CH_2$ groups linked to one another. The polyalkylene group can be represented by the formula —$(CH_2)_a$—, where "a" is an integer of from 2 to 500.

The terms "alkoxy" and "alkoxyl" as used herein to refer to an alkyl or cycloalkyl group bonded through an ether linkage; that is, an "alkoxy" group can be defined as —$OA^1$ where $A^1$ is alkyl or cycloalkyl as defined above. "Alkoxy" also includes polymers of alkoxy groups as just described; that is, an alkoxy can be a polyether such as —$OA^1$-$OA^2$ or —$OA^1$-$(OA^2)_a$-$OA^3$, where "a" is an integer of from 1 to 200 and $A^1$, $A^2$, and $A^3$ are alkyl and/or cycloalkyl groups.

The term "alkenyl" as used herein is a hydrocarbon group of from 2 to 24 carbon atoms with a structural formula containing at least one carbon-carbon double bond. Asymmetric structures such as $(A^1A^2)C=C(A^3A^4)$ are intended to include both the E and Z isomers. This can be presumed in structural formulae herein wherein an asymmetric alkene is present, or it can be explicitly indicated by the bond symbol C=C. The alkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkenyl" as used herein is a non-aromatic carbon-based ring composed of at least three carbon atoms and containing at least one carbon-carbon double bound, i.e., C=C. Examples of cycloalkenyl groups include, but are not limited to, cyclopropenyl, cyclobutenyl, cyclopentenyl, cyclopentadienyl, cyclohexenyl, cyclohexadienyl, norbornenyl, and the like. The term "heterocycloalkenyl" is a type of cycloalkenyl group as defined above, and is included within the meaning of the term "cycloalkenyl," where at least one of the carbon atoms of the ring is replaced with a heteroatom such as, but not limited to, nitrogen, oxygen, sulfur, or phosphorus. The cycloalkenyl group and heterocycloalkenyl group can be substituted or unsubstituted. The cycloalkenyl group and heterocycloalkenyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein.

The term "cycloalkynyl" as used herein is a non-aromatic carbon-based ring composed of at least seven carbon atoms and containing at least one carbon-carbon triple bound. Examples of cycloalkynyl groups include, but are not limited to, cycloheptynyl, cyclooctynyl, cyclononynyl, and the like. The term "heterocycloalkynyl" is a type of cycloalkenyl group as defined above, and is included within the meaning of the term "cycloalkynyl," where at least one of the carbon atoms of the ring is replaced with a heteroatom such as, but not limited to, nitrogen, oxygen, sulfur, or phosphorus. The cycloalkynyl group and heterocycloalkynyl group can be substituted or unsubstituted. The cycloalkynyl group and heterocycloalkynyl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein.

The term "aryl" as used herein is a group that contains any carbon-based aromatic group including, but not limited to, benzene, naphthalene, phenyl, biphenyl, phenoxybenzene, and the like. The term "aryl" also includes "heteroaryl," which is defined as a group that contains an aromatic group that has at least one heteroatom incorporated within the ring of the aromatic group. Examples of heteroatoms include, but are not limited to, nitrogen, oxygen, sulfur, and phosphorus. Likewise, the term "non-heteroaryl," which is also included in the term "aryl," defines a group that contains an aromatic group that does not contain a heteroatom. The aryl group can be substituted or unsubstituted. The aryl group can be substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol as described herein. The term "biaryl" is a specific type of aryl group and is included in the definition of "aryl." Biaryl refers to two aryl groups that are bound together via a fused ring structure, as in naphthalene, or are attached via one or more carbon-carbon bonds, as in biphenyl.

The term "aldehyde" as used herein is represented by the formula —C(O)H. Throughout this specification "C(O)" is a short hand notation for a carbonyl group, i.e., C=O.

The terms "amine" or "amino," for example —$NH_2$, as used herein are represented by the formula —$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "alkylamino" as used herein is represented by the formula —NH(-alkyl) where alkyl is a described herein. Representative examples include, but are not limited to, methylamino group, ethylamino group, propylamino group, isopropylamino group, butylamino group, isobutylamino group, (sec-butyl)amino group, (tert-butyl)amino group, pentylamino group, isopentylamino group, (tert-pentyl)amino group, hexylamino group, and the like.

The term "dialkylamino" as used herein is represented by the formula —$N(-alkyl)_2$ where alkyl is a described herein. Representative examples include, but are not limited to, dimethylamino group, diethylamino group, dipropylamino group, diisopropylamino group, dibutylamino group, diisobutylamino group, di(sec-butyl)amino group, di(tert-butyl)amino group, dipentylamino group, diisopentylamino group, di(tert-pentyl)amino group, dihexylamino group, N-ethyl-N-methylamino group, N-methyl-N-propylamino group, N-ethyl-N-propylamino group and the like.

The term "carboxylic acid" as used herein is represented by the formula —C(O)OH.

The term "ester" as used herein is represented by the formula —$OC(O)A^1$ or —$C(O)OA^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -$(A^1O(O)C-A^2-C(O)O)_a$- or -$(A^1O(O)C-A^2-OC(O))_a$-, where $A^1$ and $A^2$ can be, independently, an alkyl, cycloalkyl, alkenyl, cycloalkenyl, alkynyl, cycloalkynyl, aryl, or heteroaryl group described herein and "a" is an interger from 1 to 500. "Polyester" is as the term used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -$(A^1O-A^2O)_a$-, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "halide" as used herein refers to the halogens fluorine, chlorine, bromine, and iodine.

The term "heterocycle," as used herein refers to single and multi-cyclic aromatic or non-aromatic ring systems in which at least one of the ring members is other than carbon. Heterocycle includes azetidine, dioxane, furan, imidazole, isothiazole, isoxazole, morpholine, oxazole, oxazole, including, 1,2,3-oxadiazole, 1,2,5-oxadiazole and 1,3,4-oxadiazole, piperazine, piperidine, pyrazine, pyrazole, pyridazine, pyridine, pyrimidine, pyrrole, pyrrolidine, tetrahydrofuran, tetrahydropyran, tetrazine, including 1,2,4,5-tetrazine, tetrazole, including 1,2,3,4-tetrazole and 1,2,4,5-tetrazole, thiadiazole, including, 1,2,3-thiadiazole, 1,2,5-thiadiazole, and 1,3,4-thiadiazole, thiazole, thiophene, triazine, including 1,3,5-triazine and 1,2,4-triazine, triazole, including, 1,2,3-triazole, 1,3,4-triazole, and the like.

The term "hydroxyl" as used herein is represented by the formula —OH.

The term "ketone" as used herein is represented by the formula $A^1C(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "azide" as used herein is represented by the formula —$N_3$.

The term "nitro" as used herein is represented by the formula —$NO_2$.

The term "nitrile" as used herein is represented by the formula —CN.

The term "silyl" as used herein is represented by the formula —$SiA^1A^2A^3$, where $A^1$, $A^2$, and $A^3$ can be, independently, hydrogen or an alkyl, cycloalkyl, alkoxy, alkenyl, cycloalkenyl, alkynyl, cycloalkynyl, aryl, or heteroaryl group as described herein.

The term "sulfo-oxo" as used herein is represented by the formulas —$S(O)A^1$, —$S(O)_2A^1$, —$OS(O)_2A^1$, or —$OS(O)_2OA^1$, where $A^1$ can be hydrogen or an alkyl, cycloalkyl, alkenyl, cycloalkenyl, alkynyl, cycloalkynyl, aryl, or heteroaryl group as described herein. Throughout this specification "S(O)" is a short hand notation for S=O. The term "sulfonyl" is used herein to refer to the sulfo-oxo group represented by the formula —$S(O)_2A^1$, where $A^1$ can be hydrogen or an alkyl, cycloalkyl, alkenyl, cycloalkenyl, alkynyl, cycloalkynyl, aryl, or heteroaryl group as described herein. The term "sulfone" as used herein is represented by the formula $A^1S(O)_2A^2$, where $A^1$ and $A^2$ can be, independently, an alkyl, cycloalkyl, alkenyl, cycloalkenyl, alkynyl, cycloalkynyl, aryl, or heteroaryl group as described herein. The term "sulfoxide" as used herein is represented by the formula $A^1S(O)A^2$, where $A^1$ and $A^2$ can be, independently, an alkyl, cycloalkyl, alkenyl, cycloalkenyl, alkynyl, cycloalkynyl, aryl, or heteroaryl group as described herein.

The term "thiol" as used herein is represented by the formula —SH.

"$R^1$," "$R^2$," "$R^3$," "$R^n$," where n is an integer, as used herein can, independently, possess one or more of the groups listed above. For example, if $R^1$ is a straight chain alkyl group, one of the hydrogen atoms of the alkyl group can optionally be substituted with a hydroxyl group, an alkoxy group, an alkyl group, a halide, and the like. Depending upon the groups that are selected, a first group can be incorporated within second group or, alternatively, the first group can be pendant (i.e., attached) to the second group. For example, with the phrase "an alkyl group comprising an amino group," the amino group can be incorporated within the backbone of the alkyl group. Alternatively, the amino group can be attached to the backbone of the alkyl group. The nature of the group(s) that is (are) selected will determine if the first group is embedded or attached to the second group.

As described herein, compounds of the invention may contain "optionally substituted" moieties. In general, the term "substituted," whether preceded by the term "optionally" or not, means that one or more hydrogens of the designated moiety are replaced with a suitable substituent. Unless otherwise indicated, an "optionally substituted" group may have a suitable substituent at each substitutable position of the group, and when more than one position in any given structure may be substituted with more than one substituent selected from a specified group, the substituent may be either the same or different at every position. Combinations of substituents envisioned by this invention are preferably those that result in the formation of stable or chemically feasible compounds. In is also contemplated that, in certain aspects, unless expressly indicated to the contrary, individual substituents can be further optionally substituted (i.e., further substituted or unsubstituted).

The term "stable," as used herein, refers to compounds that are not substantially altered when subjected to conditions to allow for their production, detection, and, in certain aspects, their recovery, purification, and use for one or more of the purposes disclosed herein.

Suitable monovalent substituents on a substitutable carbon atom of an "optionally substituted" group are independently halogen; —$(CH_2)_{0-4}R^\circ$; —$(CH_2)_{0-4}OR^\circ$; —$O(CH_2)_{0-4}R^\circ$, —$O$—$(CH_2)_{0-4}C(O)OR^\circ$; —$(CH_2)_{0-4}CH(OR^\circ)_2$; —$(CH_2)_{0-4}SR^{602}$; —$(CH_2)_{0-4}Ph$, which may be substituted with $R^{602}$; —$(CH_2)_{0-4}O(CH_2)_{0-1}Ph$ which may be substituted with $R^{602}$; —CH=CHPh, which may be substituted with $R^{602}$; —$(CH_2)_{0-4}O(CH_2)_{0-1}$-pyridyl which may be substituted with $R^\circ$; —$NO_2$; —CN; —$N_3$; —$(CH_2)_{0-4}N(R^{602})_2$; —$(CH_2)_{0-4}N(R^\circ C(O)R^\circ$; —$N(R^\circ)C(S)R^{602}$; —$(CH_2)_{0-4}N(R^\circ)C(O)NR^\circ_2$; —$N(R^\circ C(S)NR^\circ_2$; —$(CH_2)_{0-4}N(R^\circ C(O)OR^\circ$; —$N(R^\circ)N(R^\circ)C(O)R^\circ_2$; —$N(R^\circ)N(R^\circ C(O)NR^\circ_2$; —$N(R^\circ)N(R^\circ C(O)OR^\circ$; —$(CH_2)_{0-4}C(O)R^\circ$; —$C(S)R^\circ$; —$(CH_2)_{0-4}C(O)OR^\circ$; —$(CH_2)_{0-4}C(O)SR^\circ$; —$(CH_2)_{0-4}C(O)OSiR^\circ_3$; —$(CH_2)_{0-4}OC(O)R^\circ$; —$OC(O)(CH_2)_{0-4}SR$—, $SC(S)SR^\circ$; —$(CH_2)_{0-4}SC(O)R^\circ$; —$(CH_2)_{0-4}C(O)NR^\circ_2$; —$C(S)NR^\circ_2$; —$C(S)SR^\circ$; —$SC(S)SR^\circ$, —$(CH_2)_{0-4}OC(O)NR^\circ_2$; —$C(O)N(OR^\circ)R^\circ$; —$C(O)C(O)R^\circ$; —$C(O)CH_2C(O)R^\circ$; —$C(NOR^\circ)R^\circ$; —$(CH_2)_{0-4}SSR^\circ$; —$(CH_2)_{0-4}S(O)_2R^\circ$; —$(CH_2)_{0-4}S(O)_2OR^\circ$; —$(CH_2)_{0-4}OS(O)_2R^\circ$; —$S(O)_2NR^\circ_2$; —$(CH_2)_{0-4}S(O)R^\circ$; —$N(R^\circ)S(O)_2NR^\circ_2$; —$N(R^\circ)S(O)_2R^\circ$; —$N(OR^\circ)R^\circ$; —$C(NH)NR^\circ_2$; —$P(O)_2R^\circ$; —$P(O)R^\circ_2$; —$OP(O)R^\circ_2$; —$OP(O)(OR^\circ)_2$; $SiR^\circ_3$; —$(C_{1-4}$ straight or branched)alkylene)O—$N(R^\circ)_2$; or —$(C_{1-4}$ straight or branched alkylene)C(O)O—$N(R^\circ)_2$, wherein each $R^\circ$ may be substituted as defined below and is independently hydrogen, $C_{1-6}$ aliphatic, —$CH_2Ph$, —$O(CH_2)_{0-1}Ph$, —$CH_2$-(5-6 membered heteroaryl ring), or a 5-6-membered saturated, partially unsaturated, or aryl ring having 0-4 heteroatoms independently selected from nitrogen, oxygen, or sulfur, or, notwithstanding the definition above, two independent occurrences of $R^\circ$, taken together with their intervening atom(s), form a 3-12-membered saturated, partially unsaturated, or aryl mono- or bicyclic ring having 0-4 heteroatoms independently selected from nitrogen, oxygen, or sulfur, which may be substituted as defined below.

Suitable monovalent substituents on $R^\circ$ (or the ring formed by taking two independent occurrences of $R^\circ$ together with their intervening atoms), are independently halogen, —$(CH_2)_{0-2}R^\bullet$, -(haloR$^\bullet$), —$(CH_2)_{0-2}OH$, —$(CH_2)_{0-2}OR^\bullet$, —$(CH_2)_{0-2}CH(OR^\bullet)_2$; —$O(haloR^\bullet)$, —CN, —$N_3$, —$(CH_2)_{0-2}C(O)R^\bullet$, —$(CH_2)_{0-2}C(O)OH$, —$(CH_2)_{0-2}C(O)OR^\bullet$, —$(CH_2)_{0-2}SR^\bullet$, —$(CH_2)_{0-2}SH$, —$(CH_2)_{0-2}NH_2$, —$(CH_2)_{0-2}NHR^\bullet$, —$(CH_2)_{0-2}NR^\bullet_2$, —$NO_2$, —$SiR^\bullet_3$, —$OSiR^\bullet_3$, —C(O)SR$^\bullet$, —$(C_{1-4}$ straight or branched alkylene)C(O)OR$^\bullet$, or —SSR$^\bullet$ wherein each $R^\bullet$ is unsubstituted or where preceded by "halo" is substituted only with one or more halogens, and is independently selected from $C_{1-4}$ aliphatic, —$CH_2Ph$, —$O(CH_2)_{0-1}Ph$, or a 5-6-membered saturated, partially unsaturated, or aryl ring having 0-4 heteroatoms independently selected from nitrogen, oxygen, or sulfur. Suitable divalent substituents on a saturated carbon atom of $R^\circ$ include =O and =S.

Suitable divalent substituents on a saturated carbon atom of an "optionally substituted" group include the following: =O, =S, =NNR*$_2$, =NNHC(O)R*, =NNHC(O)OR*, =NNHS(O)$_2$R*, =NR*, =NOR*, —O(C(R*$_2$))$_{2-3}$O—, or —S(C(R*$_2$))$_{2-3}$S—, wherein each independent occurrence of R* is selected from hydrogen, $C_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur. Suitable divalent substituents that are bound to vicinal substitutable carbons of an "optionally substituted" group include: —O(CR*$_2$)$_{2-3}$O—, wherein each independent occurrence of R* is selected from hydrogen, C$_{1-6}$ aliphatic which may be substituted as defined below, or an unsubstituted 5-6-membered saturated, partially unsaturated, or aryl ring having 0-4 heteroatoms independently selected from nitrogen, oxygen, or sulfur.

Suitable substituents on the aliphatic group of R* include halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

Suitable substituents on a substitutable nitrogen of an "optionally substituted" group include —R†, —NR†$_2$, —C(O)R†, —C(O)OR†, —C(O)C(O)R†, —C(O)CH$_2$C(O)R†, —S(O)$_2$R†, —S(O)$_2$NR†$_2$, —C(S)NR†$_2$, —C(NH)NR$_{+2}$, or —N(R†)S(O)$_2$R†; wherein each R† is independently hydrogen, C$_{1-6}$ aliphatic which may be substituted as defined below, unsubstituted —OPh, or an unsubstituted 5-6-membered saturated, partially unsaturated, or aryl ring having 0-4 heteroatoms independently selected from nitrogen, oxygen, or sulfur, or, notwithstanding the definition above, two independent occurrences of R†, taken together with their intervening atom(s) form an unsubstituted 3-12-membered saturated, partially unsaturated, or aryl mono- or bicyclic ring having 0-4 heteroatoms independently selected from nitrogen, oxygen, or sulfur.

Suitable substituents on the aliphatic group of R† are independently halogen, —R●, -(haloR●), —OH, —OR●, —O(haloR●), —CN, —C(O)OH, —C(O)OR●, —NH$_2$, —NHR●, —NR●$_2$, or —NO$_2$, wherein each R● is unsubstituted or where preceded by "halo" is substituted only with one or more halogens, and is independently C$_{1-4}$ aliphatic, —CH$_2$Ph, —O(CH$_2$)$_{0-1}$Ph, or a 5-6-membered saturated, partially unsaturated, or aryl ring having 0-4 heteroatoms independently selected from nitrogen, oxygen, or sulfur.

The term "leaving group" refers to an atom (or a group of atoms) with electron withdrawing ability that can be displaced as a stable species, taking with it the bonding electrons. Examples of suitable leaving groups include halides and sulfonate esters, including, but not limited to, triflate, mesylate, tosylate, and brosylate.

The terms "hydrolysable group" and "hydrolysable moiety" refer to a functional group capable of undergoing hydrolysis, e.g., under basic or acidic conditions. Examples of hydrolysable residues include, without limitation, acid halides, activated carboxylic acids, and various protecting groups known in the art (see, for example, "Protective Groups in Organic Synthesis," T. W. Greene, P. G. M. Wuts, Wiley-Interscience, 1999).

The term "organic residue" defines a carbon containing residue, i.e., a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic residues can preferably comprise 1 to 18 carbon atoms, 1 to 15, carbon atoms, 1 to 12 carbon atoms, 1 to 8 carbon atoms, 1 to 6 carbon atoms, or 1 to 4 carbon atoms. In a further aspect, an organic residue can comprise 2 to 18 carbon atoms, 2 to 15, carbon atoms, 2 to 12 carbon atoms, 2 to 8 carbon atoms, 2 to 4 carbon atoms, or 2 to 4 carbon atoms.

A very close synonym of the term "residue" is the term "radical," which as used in the specification and concluding claims, refers to a fragment, group, or substructure of a molecule described herein, regardless of how the molecule is prepared. For example, a 2,4-thiazolidinedione radical in a particular compound has the structure

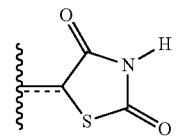

regardless of whether thiazolidinedione is used to prepare the compound. In some embodiments the radical (for example an alkyl) can be further modified (i.e., substituted alkyl) by having bonded thereto one or more "substituent radicals." The number of atoms in a given radical is not critical to the present invention unless it is indicated to the contrary elsewhere herein.

"Organic radicals," as the term is defined and used herein, contain one or more carbon atoms. An organic radical can have, for example, 1-26 carbon atoms, 1-18 carbon atoms, 1-12 carbon atoms, 1-8 carbon atoms, 1-6 carbon atoms, or 1-4 carbon atoms. In a further aspect, an organic radical can have 2-26 carbon atoms, 2-18 carbon atoms, 2-12 carbon atoms, 2-8 carbon atoms, 2-6 carbon atoms, or 2-4 carbon atoms. Organic radicals often have hydrogen bound to at least some of the carbon atoms of the organic radical. One example, of an organic radical that comprises no inorganic atoms is a 5,6,7,8-tetrahydro-2-naphthyl radical. In some embodiments, an organic radical can contain 1-10 inorganic heteroatoms bound thereto or therein, including halogens, oxygen, sulfur, nitrogen, phosphorus, and the like. Examples of organic radicals include but are not limited to an alkyl, substituted alkyl, cycloalkyl, substituted cycloalkyl, mono-substituted amino, di-substituted amino, acyloxy, cyano, carboxy, carboalkoxy, alkylcarboxamide, substituted alkylcarboxamide, dialkylcarboxamide, substituted dialkylcarboxamide, alkylsulfonyl, alkylsulfinyl, thioalkyl, thiohaloalkyl, alkoxy, substituted alkoxy, haloalkyl, haloalkoxy, aryl, substituted aryl, heteroaryl, heterocyclic, or substituted heterocyclic radicals, wherein the terms are defined elsewhere herein. A few non-limiting examples of organic radicals that include heteroatoms include alkoxy radicals, trifluoromethoxy radicals, acetoxy radicals, dimethylamino radicals and the like.

"Inorganic radicals," as the term is defined and used herein, contain no carbon atoms and therefore comprise only atoms other than carbon. Inorganic radicals comprise bonded combinations of atoms selected from hydrogen, nitrogen, oxygen, silicon, phosphorus, sulfur, selenium, and halogens such as fluorine, chlorine, bromine, and iodine, which can be present individually or bonded together in their chemically stable combinations. Inorganic radicals have 10 or fewer, or preferably one to six or one to four inorganic atoms as listed above bonded together. Examples of inorganic radicals include, but not limited to, amino, hydroxy, halogens, nitro, thiol, sulfate, phosphate, and like commonly known inorganic radicals. The inorganic radicals do not have bonded therein the metallic elements of the periodic table (such as the alkali metals, alkaline earth metals, transition metals, lanthanide metals, or actinide metals), although such metal ions can sometimes serve as a pharmaceutically acceptable cation for anionic inorganic radicals such as a sulfate, phosphate, or like anionic inorganic radical. Inorganic radicals do not comprise metalloids elements such as boron, aluminum, gallium, germanium, arsenic, tin, lead, or tellurium, or the noble gas elements, unless otherwise specifically indicated elsewhere herein.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Unless stated to the contrary, a formula with chemical bonds shown only as solid lines and not as wedges or dashed lines contemplates each possible isomer, e.g., each enantiomer and diastereomer, and a mixture of isomers, such as a racemic or scalemic mixture. Compounds described herein can contain one or more asymmetric centers and, thus, potentially give rise to diastereomers and optical isomers. Unless stated to the contrary, the present invention includes all such possible diastereomers as well as their racemic mixtures, their substantially pure resolved enantiomers, all possible geometric isomers, and pharmaceutically acceptable salts thereof. Mixtures of stereoisomers, as well as isolated specific stereoisomers, are also included. During the course of the synthetic procedures used to prepare such compounds, or in using racemization or epimerization procedures known to those skilled in the art, the products of such procedures can be a mixture of stereoisomers.

Many organic compounds exist in optically active forms having the ability to rotate the plane of plane-polarized light. In describing an optically active compound, the prefixes D and L or R and S are used to denote the absolute configuration of the molecule about its chiral center(s). The prefixes d and l or (+) and (−) are employed to designate the sign of rotation of plane-polarized light by the compound, with (−) or meaning that the compound is levorotatory. A compound prefixed with (+) or d is dextrorotatory. For a given chemical structure, these compounds, called stereoisomers, are identical except that they are non-superimposable mirror images of one another. A specific stereoisomer can also be referred to as an enantiomer, and a mixture of such isomers is often called an enantiomeric mixture. A 50:50 mixture of enantiomers is referred to as a racemic mixture. Many of the compounds described herein can have one or more chiral centers and therefore can exist in different enantiomeric forms. If desired, a chiral carbon can be designated with an asterisk (*). When bonds to the chiral carbon are depicted as straight lines in the disclosed formulas, it is understood that both the (R) and (S) configurations of the chiral carbon, and hence both enantiomers and mixtures thereof, are embraced within the formula. As is used in the art, when it is desired to specify the absolute configuration about a chiral carbon, one of the bonds to the chiral carbon can be depicted as a wedge (bonds to atoms above the plane) and the other can be depicted as a series or wedge of short parallel lines is (bonds to atoms below the plane). The Cahn-Inglod-Prelog system can be used to assign the (R) or (S) configuration to a chiral carbon.

Compounds described herein comprise atoms in both their natural isotopic abundance and in non-natural abundance. The disclosed compounds can be isotopically-labeled or isotopically-substituted compounds identical to those described, but for the fact that one or more atoms are replaced by an atom having an atomic mass or mass number different from the atomic mass or mass number typically found in nature. Examples of isotopes that can be incorporated into compounds of the invention include isotopes of hydrogen, carbon, nitrogen, oxygen, phosphorous, fluorine and chlorine, such as $^{2}H$, $^{3}H$, $^{13}C$, $^{14}C$, $^{15}N$, $^{18}O$, $^{17}O$, $^{35}S$, $^{18}F$ and $^{36}Cl$, respectively. Compounds further comprise prodrugs thereof, and pharmaceutically acceptable salts of said compounds or of said prodrugs which contain the aforementioned isotopes and/or other isotopes of other atoms are within the scope of this invention. Certain isotopically-labeled compounds of the present invention, for example those into which radioactive isotopes such as $^{3}H$ and $^{14}C$ are incorporated, are useful in drug and/or substrate tissue distribution assays. Tritiated, i.e., $^{3}H$, and carbon-14, i.e., $^{14}C$, isotopes are particularly preferred for their ease of preparation and detectability. Further, substitution with heavier isotopes such as deuterium, i.e., $^{2}H$, can afford certain therapeutic advantages resulting from greater metabolic stability, for example increased in vivo half-life or reduced dosage requirements and, hence, may be preferred in some circumstances. Isotopically labeled compounds of the present invention and prodrugs thereof can generally be prepared by carrying out the procedures below, by substituting a readily available isotopically labeled reagent for a non-isotopically labeled reagent.

The compounds described in the invention can be present as a solvate. In some cases, the solvent used to prepare the solvate is an aqueous solution, and the solvate is then often referred to as a hydrate. The compounds can be present as a hydrate, which can be obtained, for example, by crystallization from a solvent or from aqueous solution. In this connection, one, two, three or any arbitrary number of solvate or water molecules can combine with the compounds according to the invention to form solvates and hydrates. Unless stated to the contrary, the invention includes all such possible solvates.

The term "co-crystal" means a physical association of two or more molecules which owe their stability through non-covalent interaction. One or more components of this molecular complex provide a stable framework in the crystalline lattice. In certain instances, the guest molecules are incorporated in the crystalline lattice as anhydrates or solvates, see e.g. "Crystal Engineering of the Composition of Pharmaceutical Phases. Do Pharmaceutical Co-crystals Represent a New Path to Improved Medicines?" Almarasson, O., et. al., The Royal Society of Chemistry, 1889-1896, 2004. Examples of co-crystals include p-toluenesulfonic acid and benzenesulfonic acid.

It is also appreciated that certain compounds described herein can be present as an equilibrium of tautomers. For example, ketones with an α-hydrogen can exist in an equilibrium of the keto form and the enol form.

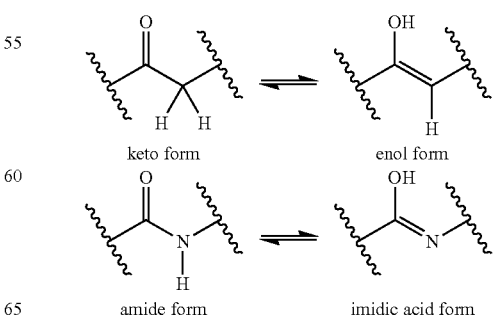

keto form     enol form amide form     imidic acid form

Likewise, amides with an N-hydrogen can exist in an equilibrium of the amide form and the imidic acid form. Unless stated to the contrary, the invention includes all such possible tautomers.

It is known that chemical substances form solids which are present in different states of order which are termed polymorphic forms or modifications. The different modifications of a polymorphic substance can differ greatly in their physical properties. The compounds according to the invention can be present in different polymorphic forms, with it being possible for particular modifications to be metastable. Unless stated to the contrary, the invention includes all such possible polymorphic forms.

In some aspects, a structure of a compound can be represented by a formula:

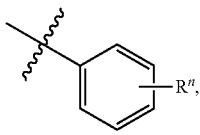

which is understood to be equivalent to a formula:

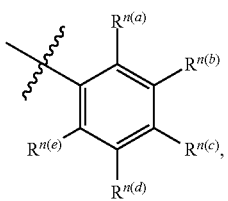

wherein n is typically an integer. That is, $R^n$ is understood to represent five independent substituents, $R^{n(a)}$, $R^{n(b)}$, $R^{n(c)}$, $R^{n(d)}$, $R^{n(e)}$. By "independent substituents," it is meant that each R substituent can be independently defined. For example, if in one instance $R^{n(a)}$ is halogen, then $R^{n(b)}$ is not necessarily halogen in that instance.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplementals (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds cannot be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific embodiment or combination of embodiments of the methods of the invention.

Each of the materials disclosed herein are either commercially available and/or the methods for the production thereof are known to those of skill in the art.

It is understood that the compositions disclosed herein have certain functions. Disclosed herein are certain structural requirements for performing the disclosed functions and it is understood that there are a variety of structures that can perform the same function that are related to the disclosed structures, and that these structures will typically achieve the same result.

B. Compositions

Disclosed herein is a composition comprising: a) a polycarbonate-polysiloxane copolymer, wherein the siloxane is present in the copolymer in an amount of about 8% by weight to about 50% by weight, and wherein the siloxane is present in the composition in an amount of about 0.8% by weight to about 9% by weight; b) a polycarbonate; c) an anti-static agent; and d) a flame retardant additive. For example, the polycarbonate can be present in an about of about 10% by weight to about 90% by weight; the polycarbonate-polysiloxane copolymer can be present in an amount of about 3% by weight to about 50% by weight; the anti-static agent can be present in an amount of about 4% by weight to about 19% by weight; and the flame retardant additive can be present in an amount of above 0% to about 30% by weight on the composition.

Certain aspects and elements of the compositions disclosed herein are described in U.S. Pat. No. 7,018,567, which is hereby incorporated by reference in its entirety.

1. Polycarbonate-Polysiloxane Copolymers

In one aspect, the polycarbonate-polysiloxane copolymer can be A-B-A triblock copolymers, or A-B diblock copolymers, or a combination thereof. In another embodiment, the polycarbonate-polysiloxane copolymer include copolymers of one or more of an acrylic polymer or a methacrylic polymer mainly comprising an alkyl acrylate or an alkyl methacrylate, a silicone polymer mainly comprising a polysiloxane and an optional diene polymer mainly comprising a conjugated diene such as butadiene or isoprene. A yet another aspect, the polycarbonate-polysiloxane copolymer of this type is polymethylmethacrylate-polyacrylic-polysiloxane copolymer, which is a core shell impact modifier wherein the shell comprises a polymethylmethacrylate graft polymer and the core is a rubbery phase comprised of a copolymer of silicone and acrylic polymers. A commercially available example of such core shell impact modifiers is Metablen® S-2001 from Mitsubishi Rayon. In one aspect, the polycarbonate-polysiloxane copolymer comprises polycarbonate-polydimethylsiloxane (PC/PDMS).

In another aspect the polycarbonate-polysiloxane copolymer comprises diorganopolysiloxane blocks of the formula:

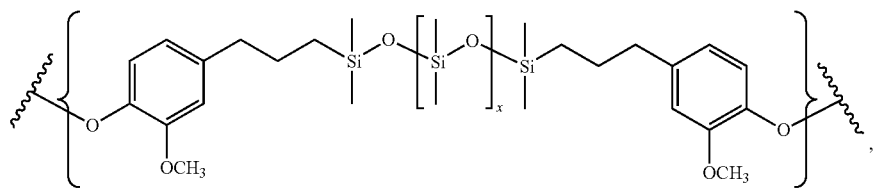

wherein x is from about 40 to about 60; and polycarbonate blocks are derived from bisphenol-A monomers; wherein the diorganopolysiloxane blocks are randomly distributed in the polysiloxane-polycarbonate block copolymer; wherein the siloxane content of the polysiloxane-polycarbonate block copolymer is about 20 wt %; and wherein the weight average molecular weight of the polysiloxane-polycarbonate block copolymer is from about 29 kDa to about 31 kDa when determined using bisphenol-A polycarbonate absolute molecular weight standards.

In yet another aspect, the polycarbonate-polysiloxane copolymer comprises diorganopolysiloxane blocks of the formula:

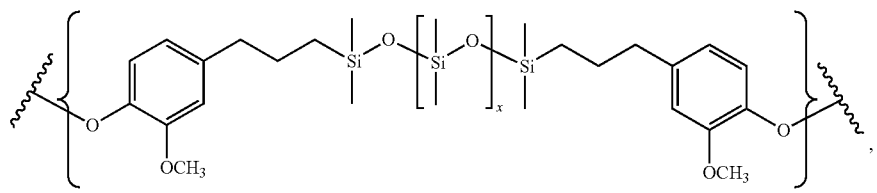

wherein x is from about 40 to about 60; and polycarbonate blocks are derived from bisphenol-A monomers; wherein the diorganopolysiloxane blocks are randomly distributed in the polysiloxane-polycarbonate block copolymer; wherein the siloxane content of the polysiloxane-polycarbonate block copolymer is about 20 wt %; wherein the weight average molecular weight of the polysiloxane-polycarbonate block copolymer is from about 29 kDa to about 31 kDa when determined using bisphenol-A polycarbonate absolute molecular weight standards; and wherein the polysiloxane-polycarbonate block copolymer is end-capped with p-cumylphenol.

Diorganopolysiloxane blocks can be derived from the corresponding dihydroxy compound of the formula:

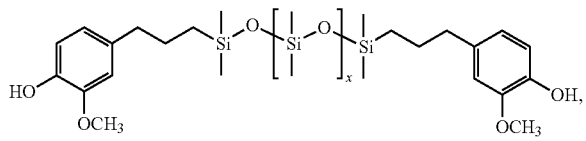

wherein x is as described above. Compounds of this type and others are further described in U.S. Pat. No. 4,746,701 to Kress, et al and U.S. Pat. No. 8,017,567 to Carrillo. Compounds of this formula may be obtained by the reaction of the appropriate dihydroxyarylene compound with, for example, an alpha, omega-bisacetoxypolydiorangonosiloxane under phase transfer conditions.

Such dihydroxy polysiloxanes can be made by effecting a platinum catalyzed addition between a siloxane hydride having the formula:

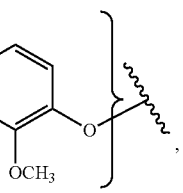

wherein x is a previously defined, and an aliphatically unsaturated monohydric phenol such as eugenol to yield a compound of the formula above.

The polycarbonate-polysiloxane copolymer may be manufactured by reaction of diphenolic polysiloxane (II) with a carbonate source and a dihydroxy aromatic compound such as bisphenol-A, optionally in the presence of a phase transfer catalyst as described above. Suitable conditions are similar to those useful in forming polycarbonates. For example, the copolymers are prepared by phosgenation, at temperatures from below 0° C. to about 100° C., preferably about 25° C. to about 50° C. Since the reaction is exothermic, the rate of phosgene addition may be used to control the reaction temperature. The amount of phosgene required will generally depend upon the amount of the dihydric reactants. Alternatively, the polycarbonate-polysiloxane copolymers may be prepared by co-reacting in a molten state, the dihydroxy monomers and a diaryl carbonate ester, such as diphenyl carbonate, in the presence of a transesterification catalyst as described above.

In the production of the polycarbonate-polysiloxane copolymer, the amount of dihydroxy diorganopolysiloxane is selected so as to provide the desired amount of diorganopolysiloxane units in the copolymer. The particular amounts used will therefore be determined depending on desired physical properties of the composition, the value of x (within the range of about 40 to about 60), and the type and relative amount of each component in the composition, including the type and amount of polycarbonate, type and amount of impact modifier, type and amount of polycarbonate-polysiloxane copolymer, and type and amount of any other additives. Suitable amounts of dihydroxy diorganopolysiloxane can be determined by one of ordinary skill in the art without undue experimentation using the guidelines taught herein. For example, the amount of dihydroxy polydiorganosiloxane may be selected so as to produce a copolymer comprising about 20% by weight polydimethylsiloxane. In one aspect, the copolymer may comprise about 20% by weight siloxane.

The polycarbonate-polysiloxane copolymer can be present in the disclosed compositions in any suitable weight percentage amount relative to the total weight of the composition. For example, the polycarbonate-polysiloxane copolymer can be present in an amount of about 3% by weight to about 50% by weight of the composition. In another example, the polycarbonate-polysiloxane copolymer can be present in an amount of about 3% by weight to about 30% by weight of the composition. In another example, the polycarbonate-polysiloxane copolymer can be present in an amount of about 3% by weight to about 20% by weight of the composition. In another example, the polycarbonate-polysiloxane copolymer can be present in an amount of about 5% by weight to about 15% by weight of the composition.

In one aspect, the siloxane is present in the copolymer in an amount of about 10% by weight to about 40% by weight. For example, the siloxane is present in the copolymer in an amount of about 13% by weight to about 30% by weight.

In one aspect, the siloxane is present in the composition in an amount of about 0.9% by weight to about 8% by weight. For example, the siloxane is present in the composition in an amount of about 1% by weight to about 7% by weight.

2. Polycarbonate

In one aspect, the polycarbonate can comprises aromatic carbonate chain units and includes compositions having structural units of the formula:

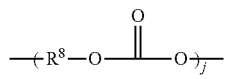

wherein at least about 60 percent of the total number of $R^8$ groups are aromatic organic radicals and the balance thereof are aliphatic, alicyclic, or aromatic radicals, wherein j is at least 2.

In one aspect, $R^8$ can be an aromatic organic radical and, such as a radical of the formula:

wherein each of $A^1$ and $A^2$ is a monocyclic, divalent aryl radical and $Y^1$ is a bridging radical having one or two atoms which separate $A^1$ from $A^2$. For example, one atom separates $A^1$ from $A^2$. Illustrative non-limiting examples of radicals of this type are —O—, —S—, —S(O)—, —S(O$_2$)—, —C(O)—, methylene, cyclohexyl-methylene, 2-[2.2.1]-bicycloheptylidene, ethylidene, isopropylidene, neopentylidene, cyclohexylidene, cyclopentade-cylidene, cyclododecylidene, and adamantylidene. The bridging radical $Y^1$ can be a hydrocarbon group or a saturated hydrocarbon group such as methylene, cyclohexylidene or isopropylidene.

Polycarbonate resins can be produced by the reaction of the carbonate precursor with dihydroxy compounds. Typically, an aqueous base such as (e.g., sodium hydroxide, potassium hydroxide, calcium hydroxide, and the like,) is mixed with an organic, water immiscible solvent such as benzene, toluene, carbon disulfide, or dichloromethane, which contains the dihydroxy compound. A phase transfer resin is generally used to facilitate the reaction. Molecular weight regulators may be added to the reactant mixture. These molecular weight regulators may be added singly or as a combination. Branching resins, described forthwith may also be added singly or in admixture. Another process for producing aromatic polycarbonate resins is the transesterification process, which involves the transesterification of an aromatic dihydroxy compound and a diester carbonate. This process is known as the melt polymerization process. The process of producing the aromatic polycarbonate resins is not critical.

As used herein, the term "dihydroxy compound" includes, for example, bisphenol compounds having general formula as follows:

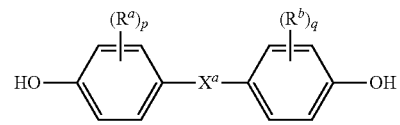

wherein $R^a$ and $R^b$ each represent a halogen atom, for example chlorine or bromine, or a monovalent hydrocarbon group, the monovalent hydrocarbon group can have from 1 to 10 carbon atoms, and can be the same or different; p and q are each independently integers from 0 to 4; Preferably, $X^a$ represents one of the groups of formula:

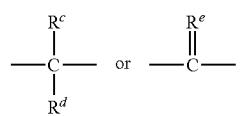

wherein $R^c$ and $R^d$ each independently represent a hydrogen atom or a monovalent linear or cyclic hydrocarbon group and $R^e$ is a divalent hydrocarbon group.

Non-limiting examples of suitable dihydroxy compounds include the dihydroxy-substituted aromatic hydrocarbons disclosed by name or formula (generic or specific) in U.S. Pat. No. 4,217,438, which is incorporated herein by reference. A nonexclusive list of specific examples of the types of bisphenol compounds that may be represented by formula (III) includes 1,1-bis(4-hydroxyphenyl)methane; 1,1-bis(4-hydroxyphenyl)ethane; 2,2-bis(4-hydroxyphenyl)propane (hereinafter "bisphenol A" or "BPA"); 2,2-bis(4-hydroxyphenyl)butane; 2,2-bis(4-hydroxyphenyl)octane; 1,1-bis(4-hydroxyphenyl)propane; 1,1-bis(4-hydroxyphenyl)n-butane; bis(4-hydroxyphenyl)phenylmethane; 2,2-bis(4-hydroxy-1-methylphenyl)propane; 1,1-bis(4-hydroxy-t-butylphenyl)propane; bis(hydroxyaryl)alkanes such as 2,2-bis(4-hydroxy-3-bromophenyl)propane; 1,1-bis(4-hydroxyphenyl)cyclopentane; and bis(hydroxyaryl)cycloalkanes such as 1,1-bis(4-hydroxyphenyl)cyclohexane. Two or more different dihydric phenols may also be used.

Typical carbonate precursors include the carbonyl halides, for example carbonyl chloride (phosgene), and carbonyl bromide; the bis-haloformates, for example the bis-haloformates of dihydric phenols such as bisphenol A, hydroquinone, and the like, and the bis-haloformates of glycols such as ethylene glycol and neopentyl glycol; and the diaryl carbonates, such as diphenyl carbonate, di(tolyl) carbonate, and di(naphthyl) carbonate.

Typical branching resins such as α,α,α',α'-tetrakis(3-methyl-4-hydroxyphenyl)-p-xylene, α,α,α',α'-tetrakis(2-methyl-4-hydroxyphenyl)-p-xylene, α,α,α',α'-tetrakis(2,5dimethyl-4-hydroxyphenyl)-p-xylene, α,α,α',α'-tetrakis(2,6dimethyl-4-hydroxyphenyl)-p-xylene, α,α,α',α'-tetrakis(4-hydroxyphenyl)-p-xylene, trimellitic acid, trimellitic anhydride, trimellitic trichloride, tris-p-hydroxy phenyl ethane, isatin-bis-phenol, tris-phenol TC (1,3,5-tris((p-hydroxyphenyl)isopropyl)benzene), tris-phenol PA (4-(4-(1,1-bis(p-hydroxyphenyl)-ethyl)alpha, alpha-dimethylbenzyl) phenol), 4-chloroformyl phthalic anhydride, trimesic acid, benzophe-none tetracarboxylic acid and the like, can also be added to the reaction mixture. Blends of linear polycarbonate and branched polycarbonate resins can be utilized herein. The branching agent may be added at a level of about 0.05 to about 2.0 weight percent (wt %).

Non-limiting examples of suitable phase transfer resins include, but are not limited to, tertiary amines such as triethylamine, quaternary ammonium compounds, and quaternary phosphonium compounds.

Molecular weight regulators or chain stoppers are optional and are added to the mixture in order to arrest the progress of the polymerization. Typical molecular weight regulators such as phenol, chroman-1, p-t-butylphenol, p-bromophenol, para-cumyl-phenol, and the like may be added either singly or in admixture and are typically added in an amount of about 1 to about 10 mol % excess with respect to the BPA. The molecular weight of the polycarbonate is generally greater than or equal to about 5000, preferably greater than or equal to about 10,000, more preferably greater than or equal to about 15,000 g/mole. In general it is desirable to have the polycarbonate resin less than or equal to about 100,000, preferably less than or equal to about 50,000, more preferably less than or equal to about 30,000 g/mole as calculated from the viscosity of a methylene chloride solution at 25° C. In one aspect, the polycarbonate can have a Mn of about 15,000 to about 30,000. In another aspect, the polycarbonate can have a Mn of about 20,000 to about 25,000. In another aspect, the polycarbonate can have a Mn of about 21,000. In another aspect, the polycarbonate can have a Mn of about 24,000.

In one aspect, the polycarbonate can be comprise two or more polycarbonates. For example, the polycarbonate can comprise two polycarbonates. The two polycarbonates can be present in about equal amounts.

In one aspect, the polycarbonate is present in an about of about 10% by weight to about 90% by weight of the composition. For example, the polycarbonate is present in an about of about 20% by weight to about 80% by weight of the composition. In another example, the polycarbonate is present in an about of about 30% by weight to about 70% by weight of the composition. In another example, the polycarbonate is present in an about of about 40% by weight to about 60% by weight of the composition. In another example, the polycarbonate is present in an about of about 10% by weight of the composition. In another example, the polycarbonate is present in an about of about 20% by weight of the composition. In another example, the polycarbonate is present in an about of about 30% by weight of the composition. In another example, the polycarbonate is present in an about of about 40% by weight of the composition. In another example, the polycarbonate is present in an about of about 50% by weight of the composition. In another example, the polycarbonate is present in an about of about 60% by weight of the composition. In another example, the polycarbonate is present in an about of about 70% by weight of the composition. In another example, the polycarbonate is present in an about of about 80% by weight of the composition. In another example, the polycarbonate is present in an about of about 90% by weight of the composition.

3. Anti-Static Agent

In one aspect, the anti-static agent can be a polyetheresteramide. Polyetheresteramide is commercially available and can have the tradename NC6321 or HC6800 which are available for Sanyo Chemical Industries, Ltd. Other suitable polyetheresteramide are PEBAX which is available from ARKEMA, and IRGASTAT which is available from CIBA. Suitable anti-static agents are described further below.

Examples of monomeric antistatic agents that may be used are glycerol monostearate, glycerol distearate, glycerol tristearate, ethoxylated amines, primary, secondary and tertiary amines, ethoxylated alcohols, alkyl sulfates, alkylarylsulfates, alkylphosphates, alkylaminesulfates, quaternary ammonium salts, quaternary ammonium resins, imidazoline derivatives, sorbitan esters, ethanolamides, betaines and mixtures of the foregoing. Non-limiting examples of commercial monomeric antistatic agents which may be used in polymeric resins are Pationic 1042 and PATIONIC AS10, available from Patco, or STATEXAN® K1, available from Bayer.

Examples of polymeric antistatic agents include: copolyesteramides such as those disclosed in U.S. Pat. No. 4,115,475 to Foy et al., U.S. Pat. Nos. 4,839,441 and 4,864,014 to Cuzin et al.; polyether-polyamide (polyetheramide) block copolymers such as those disclosed in U.S. Pat. No. 5,840,807 to Frey et al.; polyetheresteramide block copolymers such as those disclosed in U.S. Pat. Nos. 5,604,284; 5,652,326; and 5,886,098 to Ueda et al., U.S. Pat. Nos. 4,331,786; 4,230,838; 4,332,920 to Foy et al., and U.S. Pat. No. 4,195,015 to Deleens et al.; polyurethanes containing a polyalkylene glycol moiety such as those disclosed in U.S. Pat. No. 5,159,053 to Kolycheck et al., and U.S. Pat. No. 5,863,466 to Mor et al.; polyetheresters such as those disclosed in U.S. Pat. No. 5,112,940, U.S. Pat. No. 4,537,596 to Muller et al., and U.S. Pat. No. 4,038,258 to Singh et al, all of which are incorporated herein by reference. Polymeric antistatic agents have been shown to be fairly thermally stable and processable in the melt state in their neat form or in blends with other polymeric resins. Examples of polyetheramides, polyetheresters and polyefheresteramides include block copolymers and graft copolymers both obtained by the reaction between a polyamide-forming compound and/or a polyester-forming compound, and a compound containing a polyalkylene oxide unit. Polyamide forming compounds include aminocarboxylic acids such as ω-aminocaproic acid, ω-aminoenanthic acid, ω-aminoca-prylic acid, ω-aminopelargonic acid, ω-aminocapric acid, 11-aminoundecanoic acid and 12-aminododecanoic acid; lactams such as ε-caprolactam and enanthlactam; a salt of a diamine with a dicarboxylic acid, such as hexamethylene diamine adipate, hexamethylene diamine sebacate, and hex-amethylene diamine isophthalate; and a mixture of these polyamide-forming compounds. It is preferred that the polyamide-forming compound is a caprolactam, 12-amin-ododecanoic acid, or a combination of hexamethylene diamine and adipate.

Polyester forming compounds include a combination of a dicarboxylic acid (or a mixture of two or more dicarboxylic acids) with an aliphatic diol (or a mixture of two or more aliphatic diols). Non-limiting examples of dicarboxylic acids include aromatic dicarboxylic acids, such as isoph-thalic acid, terephthalic acid, phthalic acid, naphthalene-2,6-dicarboxylic acid, naphthalene-2,7-dicarboxylic acid, diphenyl-4,4'-dicarboxylic acid, diphenoxyethanedicar-boxylic acid and sodium 3-sulfoisophthalate; alicyclic dicarboxylic acids, such as 1,3-cyclopentanedicarboxylic acid, 1,4cyclohexanedicarboxylic acid, 1,2-cyclohexanedicar-boxylic acid and 1,3-dicarboxymethylcyclohexane; and aliphatic dicarboxylic acids, such as succinic acid, oxalic acid, adipic acid, sebacic acid and decanedicarboxylic acid. These dicarboxylic acids may be used individually or in combination. Non-limiting examples of aliphatic diols include ethylene glycol, 1,2-propylene glycol, 1,3-propylene glycol, 1,2-butanediol, 1,3-butanediol, 2,3-butanediol, 1,4-butane-diol, neopentyl glycol and hexanediol. These aliphatic diols may be used individually or in combination. Preferred dicarboxylic acids are terephthalic acid, isophthalic acid, 1,4-cyclohexanedicarboxylic acid, and sebacic acid and decanedicarboxylic acid. Preferred diols are ethylene glycol, 1,2-propylene glycol, 1,3-propylene glycol and 1,4-butane-diol.

Compounds containing polyalkylene oxide units such as polyethylene glycol, polypropylene glycol, polytetramethylene glycol and a block or random copolymer of ethylene oxide and tetramethylene oxide; diamines obtained by replacing the terminal hydroxyl groups of these diols by amino groups; and dicarboxylic acids obtained by replacing the terminal hydroxyl groups of these diols by carboxylic acid groups can be used to form the polyetheramide, polyetherester and polyetheresteramide polymeric antistatic agents. These compounds containing a polyalkylene oxide unit can be used individually or in combination. Of these compounds, polyethylene glycol is preferred.

For synthesizing a polyetheramide, a polyetherester or a polyetheresteramide, there can be employed a method in which a polyamide-forming compound and/or a polyester-forming compound is reacted with a polyalkylene oxide unit-containing compound, wherein, depending on the type of the terminal groups of the polyalkylene oxide unit-containing compound, the reaction is an esterification reaction or an amidation reaction. Further, depending on the type of the reaction, a dicarboxylic acid or a diamine may also be used in the reaction.

Polymeric anti-static agents such as PELESTAT 6321, available from Sanyo Chemical Industries, or PEBAX MH1657, available from ARKEMA, are non-limiting examples of commercially available polymeric antistatic agents that may be added to polymeric resins to improve conductive properties. Other commercially available anti-static agents are IRGASTAT P18 and P22 from CIBA. Other polymeric materials that may be used as antistatic agents are doped inherently conducting polymers such as polyaniline (commercially available as PANIPOL® EB from Panipol), polypyrrole and polythiophene (commercially available from Bayer), which retain some of their intrinsic conductivity after melt processing at elevated temperatures.

In one aspect, the anti-static agent can be present in an amount of about 4% by weight to about 19% by weight of the composition. In another aspect, the anti-static agent can be present in an amount of about 5% by weight to about 19% by weight of the composition. For example, the anti-static agent can be present in an amount of about 4% by weight of the composition. In another example, the anti-static agent can be present in an amount of about 5% by weight of the composition. In another example, the anti-static agent can be present in an amount of about 6% by weight of the composition. In another example, the anti-static agent can be present in an amount of about 7% by weight of the composition. In another example, the anti-static agent can be present in an amount of about 8% by weight of the composition. In another example, the anti-static agent can be present in an amount of about 9% by weight of the composition. In another example, the anti-static agent can be present in an amount of about 10% by weight of the composition. In another example, the anti-static agent can be present in an amount of about 11% by weight of the composition. In another example, the anti-static agent can be present in an amount of about 12% by weight of the composition. In another example, the anti-static agent can be present in an amount of about 13% by weight of the composition. In another example, the anti-static agent can be present in an amount of about 14% by weight of the composition. In another example, the anti-static agent can be present in an amount of about 15% by weight of the composition. In another example, the anti-static agent can be present in an amount of about 16% by weight of the composition. In another example, the anti-static agent can be present in an amount of about 17% by weight of the composition. In another example, the anti-static agent can be present in an amount of about 18% by weight of the composition. In another example, the anti-static agent can be present in an amount of about 19% by weight of the composition.

4. Flame Retardant Additive

The compositions comprise at least one flame retardant additive, generally a halogenated material, an organic phosphate, or a combination of the two. For compositions containing polyphenylene ether or a polycarbonate, the organic phosphate classes of materials can be used. The organic phosphate can be an aromatic phosphate compound of the formula:

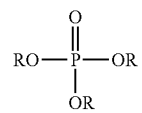

wherein each R is the same or different and is preferably an alkyl, a cycloalkyl, an aryl, an alkyl substituted aryl, a halogen substituted aryl, an aryl substituted alkyl, a halogen, or a combination of at least one of the foregoing phosphate compounds provided at least one R is aryl.

Examples of suitable phosphate compounds include, but are not limited to, phenyl bis(dodecyl)phosphate, phenyl bis(neopentyl)phosphate, phenyl bis(3,5,5'-trimethylhexyl phosphate), ethyl diphenyl phosphate, 2-ethylhexyl bis(p-tolyl)phosphate, bis(2-ethylhexyl) p-tolyl phosphate, tritolyl phosphate, bis(2-ethylhexyl)phenyl phosphate, tri(nonylphenyl)phosphate, bis(dodecyl)p-tolyl phosphate, tricresyl phosphate, triphenyl phosphate, dibutylphenyl phosphate, 2-chloroethyl diphenyl phosphate, p-tolyl bis(2,5,5'-trimethylhexyl)phosphate, 2-ethylhexyl diphenyl phosphate, and the like. The preferred phosphates are those in which each R is aryl. A preferred phosphate compound is triphenyl phosphate, which may be unsubstituted or substituted, for example, isopropylated triphenyl phosphate.

In another aspect, the organic phosphate can be a di- or polyfunctional compound or polymer having one of the formulas below:

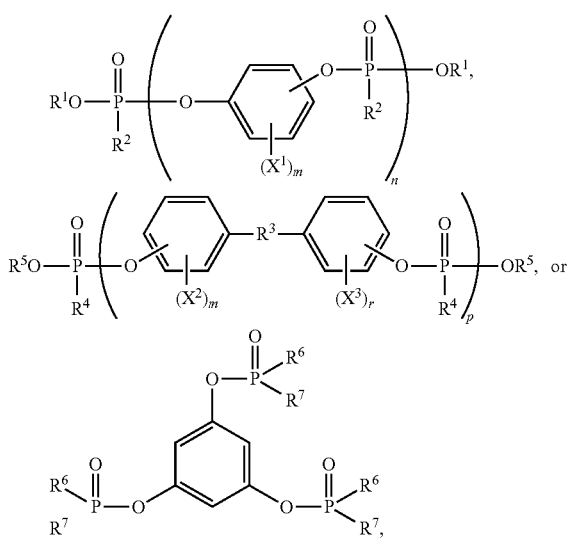

including mixtures thereof, wherein each $R^1$, $R^3$, and $R^5$ is independently, hydrocarbon; wherein each $R^2$, $R^4$, $R^6$, and $R^7$ is independently hydrocarbon or hydrocarbonoxy; wherein each $X^1$, $X^2$ and $X^3$ are independently halogen; m and r are 0 or integers from 1 to 4, and n and p are from 1 to 30.

Examples of di- and polyfunctional phosphate compounds include the bis(diphenyl phosphates) of resorcinol, hydroquinone and bisphenol-A, respectively, or their polymeric counterparts. Methods for the preparation of the aforementioned di- and polyfunctional phosphates are described in British Patent No. 2,043,083, which is hereby incorporated by reference in its entirety. Another group of useful flame-retardants include certain cyclic phosphates, for example, diphenyl pentaerythritol diphosphate, as a flame retardant resin for polyphenylene ether resins, as is described by Axelrod in U.S. Pat. No. 4,254,775, which is hereby incorporated by reference in its entirety.

In another aspect, the flame retardant additive can be phosphoramides of the formula:

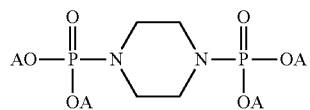

wherein each A is a 2,6-dimethylphenyl moiety or a 2,4,6-trimethylphenyl moiety. These phosphoramides are piperazine-type phosphoramides. These additives are described in Talley, J. Chem. Eng. Data, 33, 221 222 (1988).

The flame retardant additive can comprise a single phosphate compound or a mixture of two or more different types of phosphate compounds. In one aspect, compositions comprising essentially a single phosphate compound are disclosed. Suitable phosphate flame retardant additives include, but are not limited to, those based upon resorcinol such as, for example, resorcinol bis(diphenyl phosphate), as well as those based upon bisphenols such as, for example, bisphenol A bis(diphenyl phosphate). The aforementioned piperazine-type phosphoramides are also suitable as flame retardant additives. Phosphates comprising substituted phenyl groups can also be used as flame retardant additives. For example, the organophosphate can be butylated triphenyl phosphate ester. In another example, phosphate compounds can be resorcinol bis(diphenyl phosphate) (hereinafter RDP), bisphenol A bis(diphenyl phosphate) (hereinafter BPADP) and N,N'-bis[di-(2,6-xylyl)phosphoryl]-piperazine (hereinafter XPP), and mixtures thereof. In one aspect, BPADP can be a used as flame retardant additive.

Halogenated materials are also a useful class of flame-retardant additives. These materials are can be aromatic halogen compounds and resins of the formula:

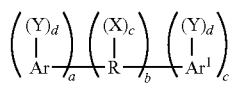

wherein R can be alkylene, alkylidene or a cycloaliphatic linkage, e.g., methylene, ethylene, propylene, isopropylene, isopropylidene, butylene, isobutylene, amylene, cyclohexylene, cyclopentylidene, and the like; a linkage selected from the group consisting of either oxygen ether; carbonyl; amine; a sulfur containing linkage, e.g., sulfide, sulfoxide, sulfone; a phosphorus containing linkage; R can also consist of two or more alkylene or alkylidene linkages connected by such groups as aromatic, amino, ether, carbonyl, sulfide, sulfoxide, sulfone or a phosphorus containing linkage. Ar and Ar' are mono- or polycarbocyclic aromatic groups such as phenylene, biphenylene, terphenylene, naphthylene, and the like. Ar and Ar' may be the same or different. Y is a substituent selected from the group consisting of organic, inorganic or organometallic radicals including but not limited to a halogen, ether groups of the general formula OE, wherein E is a monovalent hydrocarbon radical similar to X, monovalent hydrocarbon groups of the type represented by R or other substituents, e.g., nitro, cyano, and the like, substituents being essentially inert provided there be at least one and preferably two halogen atoms per aryl nucleus. X is a monovalent hydrocarbon group such as an alkyl, e.g., methyl, ethyl, propyl, isopropyl, butyl, decyl, and the like; an aryl group, e.g., phenyl, naphthyl, biphenyl, xylyl, tolyl, and the like; an aralkyl group e.g., benzyl, ethylphenyl, and the like, a cycloaliphatic groups, e.g., cyclopentyl, cyclohexyl, and the like, and a monovalent hydrocarbon groups containing inert substituents therein. It is understood that where more than one X is used, they can be alike or different. The letter d represents a whole number ranging from 1 to a maximum equivalent to the number of replaceable hydrogens substituted on the aromatic rings comprising Ar or Ar'. The letter e represents a whole number ranging from 0 to a maximum controlled by the number of replaceable hydrogens on R. The letters a, b, and c represent whole numbers including 0. When b is not 0, neither a nor c can be 0. Otherwise either a or c, but not both, may be 0. Where b is 0, a direct carbon-carbon bond joins the aromatic groups. The hydroxyl and Y substituents on the aromatic groups, Ar and Ar' can be varied in the ortho, meta or para positions on the aromatic rings and the groups can be in a variety of possible geometric relationship with respect to one another.

Suitable halogenated flame retardant additives include, but are not limited to, 2,2-bis-(3,5-dichlorophenyl)-propane, bis-(2-chlorophenyl)-methane, bis(2,6-dibromophenyl)-methane, 1,1-bis-(4-iodophenyl)-ethane, 1,2-bis-(2,6-dichlorophenyl)-ethane, 1,1-bis-(2-chloro-4-iodophenyl)ethane, 1,1-bis-(2-chloro-4-methylphenyl)-ethane, 1,1-bis-(3,5-dichlorophenyl)-ethane, 2,2-bis-(3-phenyl-4-bromophenyl)-ethane, 2,6-bis-(4,6-dichloronaphthyl)-propane, 2,2-bis-(2, 6-dichlorophenyl)-pentane, 2,2-bis-(3,5-dichromophenyl)-hexane, bis-(4-chlorophenyl)-phenyl-methane, bis-(3,5- dichlorophenyl)-cyclohexylmethane, bis-(3-nitro-4-bromophenyl)-methane, bis-(4-hydroxy-2,6-dichloro-3-methoxyphenyl)-methane, 2,2-bis-(3,5-dichloro-4-hydroxyphenyl)-propane and 2,2bis-(3-bromo-4-hydroxyphenyl)-propane. The preparation of these halogenated flame-retardants can be by condensation of two moles of a phenol with a single mole of a ketone or aldehyde. In place of the divalent aliphatic group in the above examples may be substituted oxygen, sulfur, sulfoxy, and the like.

Other suitable halogenated flame retardant additives include, but are not limited to, 1,3-dichlorobenzene, 1,4-dibrombenzene, 1,3-dichloro-4-hydroxybenzene and biphenyls such as 2,2'-dichlorobiphenyl, polybrominated 1,4-diphenoxybenzene, 2,4'-dibromobiphenyl, and 2,4'-dichlorobiphenyl as well as decabromo diphenyl oxide, and the like. Also useful are oligomeric and polymeric halogenated aromatic compounds, such as, for example, a copolycarbonate of bisphenol A and tetrabromobisphenol A and a carbonate precursor, e.g., phosgene. Metal synergists, e.g., antimony oxide, may also be used with the flame retardant.

In another aspect, the flame retardant additive can be selected from the group consisting of halogen-free phosphinate, halogen-free disphosphinate, reaction product of melamine with phosphoric acid, and phosphazene compounds, or a mixture thereof. For example, the flame retardant additive can comprise aluminum phosphinate and melamine polyphosphate.

The incorporation of flame retardant additives also affords methods to increase the heat distortion temperature (HDT) of the flame retardant antistatic compositions so that the composition has a flammability rating of at least V-2, at least V-1, or a flammability rating of V-0 as measured in accordance with a UL-94 protocol at a thickness of 1.5 mm. In one aspect, the compositions have a flammability rating of V-0.

In one aspect, the flame retardant additive is present in an amount of above 0% to about 30% by weight on the composition. For example, the flame retardant additive is present in an amount of about 1% to about 30% by weight on the composition. In another example, the flame retardant additive is present in an amount of about 5% to about 25% by weight on the composition. In another example, the flame retardant additive is present in an amount of about 10% to about 20% by weight on the composition. In another example, the flame retardant additive is present in an amount of about 5% by weight on the composition. In another example, the flame retardant additive is present in an amount of about 10% by weight on the composition. In another example, the flame retardant additive is present in an amount of about 13% by weight on the composition. In another example, the flame retardant additive is present in an amount of about 15% by weight on the composition. In another example, the flame retardant additive is present in an amount of about 20% by weight on the composition.

5. Other Additives

The compositions disclosed herein can also comprise other additives suitable in the disclosed compositions. Such additives include, but are not limited to, an anti-oxidant, a mold release agent, a filler or an anti-drip agent, or a mixture thereof. For example, the compositions can comprise an anti-oxidant. In another example, the compositions can comprise a mold release agent. In another example, the compositions can comprise a filler. In another example, the compositions can comprise an anti-drip agent. In one aspect, the composition can comprise at least two other additives. In one aspect, the composition can comprise at least three other additives. In one aspect, the composition can comprise at least four other additives. For example, the composition can comprise an anti-oxidant, a mold release agent, a filler and an anti-drip agent. In another example, the composition can comprise a filler and an anti-drip agent.

Suitable anti-drip agents can comprise polytetrafluoroethylene (PTFE). In one aspect, the PTFE can be encapsulated in styrene-acrylonitrile copolymer (SAN). In one aspect, the blend of PTFE and styrene-acrylonitrile copolymer (TSAN) is a 1:1 blend. In one aspect, the anti-drip agent, such as TSAN or PTFE, can be present in an amount above 0% by weight to about 2% by weight of the composition. In another aspect, the anti-drip agent, such as TSAN or PTFE, can be present in an amount of about 0.2% by weight to about 1.5% by weight of the composition. In yet another aspect, the anti-drip agent, such as TSAN or PTFE, can be present in an amount of about 0.3% by weight to about 1% by weight of the composition.

Suitable fillers include, but are not limited to talc, mica, milled glass fiber, glass fiber, glass flakes, glass beads, wollastonite, whiskers, carbon fiber, carbon powder, or milled carbon fiber, or a combination thereof. For example, the filler can be talc. In another example, the filler can be mica. In another example, the filler can be milled glass fiber. In another example, the filler can be glass fiber. In another example, the filler can be glass flakes. In another example, the filler can be glass beads. In another example, the filler can be wollastonite. In another example, the filler can be whiskers. In another example, the filler can be carbon fiber. In another example, the filler can be carbon powder. In another example, the filler can be or milled carbon fiber. In one aspect, the filler is present in an amount above 0% by weight to about 50% by weight of the composition. For example, the filler is present in an amount above 0% by weight to about 40% by weight of the composition. In another example, the filler is present in an amount above 0% by weight to about 30% by weight of the composition. In another example, the filler is present in an amount above 0% by weight to about 20% by weight of the composition. In another example, the filler is present in an amount above 0% by weight to about 10% by weight of the composition.

In one aspect, the anti-oxidant agent can comprise a primary anti-oxidant agent and a secondary anti-oxidant agent. In one aspect, the primary anti-oxidant agent and a secondary anti-oxidant agent are not identical anti-oxidant agents. The primary anti-oxidant agent and a secondary anti-oxidant agent can be present in the same amount by weight in the composition. Any anti-oxidant agent can be a primary or secondary anti-oxidant agent. Anti-oxidant agents suitable for application in a polymer composition are known in the art. Non limiting examples of suitable anti-oxidant agents include phosphites and propionates. For example, the composition can comprise tris(2,4-di-tert-butyl)phosphite. Tris(2,4-di-tert-butyl)phosphite is available under the tradename Adeka stab 2112 from ADEKA. In another example, the composition can comprise octadecyl-3(3,5-di-t-butyl-4-hydroxyphenyl)propionate. Octadecyl-3(3,5-di-t-butyl-4-hydroxyphenyl)propionate is available under the tradename Adeka stab AO-50 from ADEKA. Other suitable anti-oxidant agents also include, but are not limited to, organophosphites such as tris(nonyl phenyl)phosphite, bis(2,4-di-t-butylphenyl)pentaerythritol diphosphite, distearyl pentaerythritol diphosphite; alkylated monophenols or polyphenols; alkylated reaction products of polyphenols with dienes, such as tetrakis[methylene(3,5-di-tert-butyl-4-hydroxyhydrocinnamate)] methane; butylated reaction products of para-cresol or dicyclopentadiene; alkylated hydroquinones; hydroxylated thiodiphenyl ethers; alkylidene-bisphenols; benzyl compounds; esters of beta-(3,5-di-tert-butyl-4-hydroxyphenyl)- propionic acid with monohydric or polyhydric alcohols; esters of beta-(5-tert-butyl-4-hydroxy-3-methylphenyl)-propionic acid with monohydric or polyhydric alcohols; esters of thioalkyl or thioaryl compounds such as distearylthiopropionate, dilaurylthiopropionate, ditridecylthiodipropionate, pentaerythrityl-tetrakis 3-(3,5-di-tert-butyl-4-hydroxyphenyl)propionate; amides of beta-(3,5-di-tert-butyl-4-hydroxyphenyl)-propionic acid, or combinations including at least one of the foregoing antioxidants.

In one aspect, the antioxidant agents are used in amounts of above 0% to about 1% by weight based on the total weight of the polymer component. For example, half of the about of the antioxidant agent can be the primary antioxidant agent and the other half of the antioxidant agent can be the secondary antioxidant agent. For example, the primary antioxidant agent can be present in 0.08% by weight and the secondary antioxidant agent can be present in 0.08% by weight. In another aspect, the antioxidant agents are used in amounts of above 0% to about 0.8% by weight. In another aspect, the antioxidant agents are used in amounts of above 0% to about 0.6% by weight. In another aspect, the antioxidant agents are used in amounts of above 0% to about 0.4% by weight. In another aspect, the antioxidant agents are used in amounts of above 0% to about 0.2% by weight.

Plasticizers, lubricants, and/or mold release agents can also be used in the composition. There is considerable overlap among these types of materials, which include phthalic acid esters such as dioctyl-4,5-epoxy-hexahydrophthalate; tris-(octoxycarbonylethyl)isocyanurate; tristearin; poly-alpha-olefins; epoxidized soybean oil; esters, for example, fatty acid esters such as alkyl stearyl esters, e.g., methyl stearate, stearyl stearate, pentaerythritol tetrastearate, and the like; combinations of methyl stearate and hydrophilic and hydrophobic nonionic surfactants including polyethylene glycol polymers, polypropylene glycol polymers, poly(ethylene glycol-co-propylene glycol) copolymers, or a combination including at least one of the foregoing glycol polymers, e.g., methyl stearate and polyethylene-polypropylene glycol copolymer in a solvent; and waxes such as beeswax, montan wax, and paraffin wax. Other suitable mold release agents for polymeric compositions are known in the art. A suitable non-limiting example of a mold release agent is pentaerythritol tetrastearate. In one aspect, the mold release agent can be present in an amount above 0% by weight to about 5% by weight of the composition. For example, the mold release agent can be present in an amount above 0% by weight to about 3% by weight of the composition. For example, the mold release agent can be present in an amount above 0% by weight to about 1% by weight of the composition.

6. Composition Properties

In one aspect, the composition can have a flammability rating of V-0. In another aspect, the composition can have a flammability rating of V-1. In another aspect, the composition can have a flammability rating of V-2.

In one aspect, the composition can have a notched IZOD of greater than 200 J/m. In another aspect, the composition can have a notched IZOD of greater than 300 J/m. In another aspect, the composition can have a notched IZOD of greater than 400 J/m. In another aspect, the composition can have a notched IZOD of greater than 500 J/m. In another aspect, the composition can have a notched IZOD of greater than 600 J/m. In another aspect, the composition can have a notched IZOD of greater than 700 J/m. In another aspect, the composition can have a notched IZOD of between 300 J/m and 700 J/m.

In one aspect, the composition has an anti-static property of a half-life of less than 60 seconds. In another aspect, the composition has an anti-static property of a half-life of less than 10 seconds.

In one aspect, the composition has an anti-static property of a half-life of less than 10 seconds; a notched IZOD of greater than 300 J/m; and a flammability rating of V-0. In another aspect, the composition has an anti-static property of a half-life of less than 10 seconds; a notched IZOD of greater than 400 J/m; and a flammability rating of V-0. In another aspect, the composition has an anti-static property of a half-life of less than 10 seconds; a notched IZOD of greater than 500 J/m; and a flammability rating of V-0. In another aspect, the composition has an anti-static property of a half-life of less than 10 seconds; a notched IZOD of greater than 600 J/m; and a flammability rating of V-0.

C. Methods

Also disclosed herein are methods for the manufacturer of compositions. In one aspect, the methods can manufacturer the compositions described elsewhere herein. In one aspect, the compositions can be made by a method comprising extruding a mixture of the components of the composition.

In one aspect, the composition can be made by steps such as dry blending followed by melt processing, the latter operation frequently being performed under continuous conditions such as extrusion. In another exemplary method, the components of the composition, e.g., the polycarbonate, polycarbonate-polysiloxane copolymer, anti-static agent and flame retardant agent, are fed directly into the throat of a twin screw extruder and extruded at a temperature greater than the melting point of the polycarbonate. It is also possible for the various components of the composition to be fed into the extruder sequentially, including an anti-oxidant, a mold release agent, a filler or an anti-drip agent, or a mixture thereof. Additionally, some of the components such as the antioxidant and the antistatic agent may be fed into the extruder in a masterbatch form. The strand emerging from the extruder is quenched in a water bath, pelletized and subjected into additional processing such as injection molding, blow molding, vacuum forming, and the like.

In one aspect, the methods comprise providing the materials described herein. The methods can be carried out in an extruder, such as a twin screw extruder, such as a JSW, TEX44α II twin screw extruder with 44 mm screw diameter.

D. Articles of Manufacture

Also disclosed herein is a device comprising the compositions described herein. Suitable devices include, but are not limited to a housing or internal part for a TV, Notebook, laptop, personal computer (PC), cellular phone, telephone, tablet, copier, printer, projector, automated teller machine (ATM) or advanced media data storage, memory device, air conditioner, vacuum cleaner, game machine, or electric tool.

E. EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Example 1

Compositions and Properties Thereof a. Materials and Method

For the data discussed herein the following materials and methods were used.

Polycarbonate-1 (PC-1): BPA polycarbonate having a Mn of 26,000. PC-2: BPA polycarbonate having a Mn of 21,000. The experiments were performed with a 50:50 ration of PC-1 and PC-2.

The antisatic agent that was used was: PELESATAT HC6800, NC6321 Polyetheresteramide which is available from Sanyo Chemical Industries, Ltd.

The polytetrafluoroethylene (PTFE) composition used was encapsulated with styren-acrylonitril copolymer(SAN) (TSAN). The PTFE content is 50% by weight.

The antioxidant composition that was used was tris(2,4-di-tert-butyl)phosphite. Such composition can have the trade name Adeka stab 2112 and is available from ADEKA.

The antioxidant composition used was octadecyl-3(3,5-di-t-butyl-4-hydroxyphenyl)propionate. Such composition can have the trade name Adeka stab AO-50 and is available from ADEKA. The total amount of anti-oxidant used in this example was 0.16%.

The mold release composition used was pentaerythritol.

The notched IZOD impact was determined by the ASTM D256 method at 23° C. at a 50% humidity.

The flammability of the compositions was determined by the UL94 V-0 standard. The thickness of the composition during the testing was 1.5 mm.

The antistatic performance in terms of the half life time was measured by Shishido-Denki STATIC HONESTMETER H-0110, based on JIS L 1094 standard. Discharge voltage is 9.0 KV at 23° C. at a 50% humidity. The composition was measured after 6 hrs aging at the same condition as the initial measurement.

The compositions that were tested were made by the following extrusion conditions. A JSW, TEX44αII extruder was used having a srew diameter of 44 mm. The extrusino temperature was 250° C. The screw speed was 200 RPM. The molding of the composition was performed on a TOYO Ti80G2 molding machine. The composition was pre dried at 90° C. for 4 hrs. The barrel set up temperature from the nozzle was 230° C., 240° C., 240° C., 230° C., and 220° C. The molding temperature was 40° C.

b. Results

Compositions made from the materials and methods discussed above were made with the following specifics and having the disclosed properties. The comparative examples demonstrate the improved properties of the disclosed compositions described herein.

Table 1 shows compositions with desired properties.

TABLE 1

| Component | Example 1 | Example 2 | Example 3 | Example 4 | Example 5 | Example 6 |
|---|---|---|---|---|---|---|
| Aromatic Polycarbonate (PC-1:PC-2 = 50:50) | 67.54 | 62.54 | 72.54 | 62.54 | 65.54 | 65.54 |
| PC-Siloxane copolymer (Si 20%) | 10 | 15 | 5 | 15 | 15 | 15 |
| PC-Siloxane copolymer (Si 6%) | — | — | — | — | — | — |
| Siloxane content (wt %) | 2 | 3 | 1 | 3 | 3 | 3 |
| Antistatic agent (HC6800) | 8 | 8 | 8 | — | 5 | — |
| Antistatic agent (NC6321) | — | — | — | 8 | — | 5 |
| Flame Retardant (BPADP) | 13 | 13 | 13 | 13 | 13 | 13 |
| PTFE composition (TSAN) | 1 | 1 | 1 | 1 | 1 | 1 |
| Antioxidants | 0.16 | 0.16 | 0.16 | 0.16 | 0.16 | 0.16 |
| Mold release agent | 0.3 | 0.3 | 0.3 | 0.3 | 0.3 | 0.3 |
| TOTAL | 100 | 100 | 100 | 100 | 100 | 100 |
| n-IZOD, J/m | 643 | 698 | 396 | 710 | 655 | 746 |
| half life time, | 2.2 | 1.8 | 2.5 | 5.9 | 27.3 | 12.1 |
| V-0 @ 1.5 mm | pass | pass | pass | pass | pass | pass |

Table 2 shows the results of the comparative compositions.

TABLE 2

| Component | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Aromatic Polycarbonate (PC-1:PC-2 = 50:50) | 76.54 | 74.54 | 44.04 | 27.54 | 27.54 | 55.54 | 50.54 | 50.54 | 67.54 | 67.54 |
| PC-Siloxane copolymer (Siloxane 20%) | 1 | 3 | — | — | 50 | 10 | 15 | 15 | 15 | 15 |
| PC-Siloxane copolymer (Siloxane 6%) | — | — | 33.5 | 50 | — | — | — | — | — | — |
| Siloxane content (wt %) | 0.2 | 0.6 | 2.01 | 3 | 10 | 2 | 3 | 3 | 3 | 3 |
| Antistatic agent (HC6800) | 8 | 8 | 8 | 8 | 8 | 20 | 20 | — | 3 | — |

TABLE 2-continued

| Component | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Antistatic agent (NC6321) | — | — | — | — | — | — | — | 20 | — | 3 |
| Flame Retardant (BPADP) | 13 | 13 | 13 | 13 | 13 | 13 | 13 | 13 | 13 | 13 |
| PTFE composition (TSAN) | 1 | 1 | 1 | 1 | 1 | 1 | 1 | 1 | 1 | 1 |
| Antioxidants | 0.16 | 0.16 | 0.16 | 0.16 | 0.16 | 0.16 | 0.16 | 0.16 | 0.16 | 0.16 |
| Mold release agent | 0.3 | 0.3 | 0.3 | 0.3 | 0.3 | 0.3 | 0.3 | 0.3 | 0.3 | 0.3 |
| TOTAL | 100 | 100 | 100 | 100 | 100 | 100 | 100 | 100 | 100 | 100 |
| n-IZOD, J/m | 105 | 117 | 616 | 570 | 728 | 782 | 758 | 803 | 629 | 757 |
| half life time, | 2.1 | 2.4 | 1.6 | 1.6 | 0.5 | 0.5 | 0.5 | 1.0 | Infinity | Infinity |
| V-0 @ 1.5 mm | fail | pass | fail | fail | fail | fail | fail | fail | pass | pass |

Example No. 1-4 in Table 1 showed excellent properties of the notched IZOD impact, half life time, and flammability (passed V-0 test at 1.5 mm). Half life time are desired to be below 10 sec which indicates excellent antistatic performance. N-IZOD impact is desired to be above 300 J/m which indicates good performance. Passing V-0 test is desired. The data indicates that various anti-static agents can be used while maintaining desired performance of the composition. The compositions should have appropriate anti-static loading (%).

Example No. 5-6 in Table 1 also showed good properties of the notched IZOD impact, half life time, and flammability (passed V-0 test at 1.5 mm). The half life time was less than 60 sec. The notched IZOD impact and flammability performance was comparable to the examples 1-4.

Comparative Example 1 shows that a composition with a low content (1% by weight) of the polycarbonate-polysiloxan copolymer have a desired half life time. However, such composition have a low and undesired notched IZOD impact and failed the flammability test.

Comparative Example 2 shows that a composition with 3% by weight of the polycarbonate-polysiloxan copolymer have a low and undesired notched IZOD impact while having a desired half life time and passed the flammability test.

Comparative Example 3-4 showed that siloxane loading of 6% in the polycarbonate-polysiloxane copolymer required excess amount of the polycarbonate-polysiloxane copolymer to be present in the composition (to achieved desired siloxane loading in the composition). The excess amount of polycarbonate-polysiloxane copolymer resulted in that the composition failed the flammability test due to undesired dripping and undesired flame out times. However, such composition possessed desired notched IZOD impact and half life time.

Comparative Example 5 showed that a composition having 50% of the polycarbonate-polysiloxane copolymer having 20% loading of siloxane also fails the flammability test.

Comparative Example 6-8 shows that too high of an amount of antistatic agent loading causes the composition to fail the flammability test due to too long flame out times, this is observed even if appropriate amounts of the polycarbonate-polysiloxane copolymer are used. PC Siloxane copolymer usage, basically antistatic performance is excellent. But failed V-0 performance due to over flame out time. And no PC copolymer case example 4 showed lower value of impact performance as well.

Comparative Example 9-10 shows that too low amounts of anti-static agent loadings in the composition causes the composition to have undesired or no antistatic performance.

The data shown in tables 3-20 passes the flammability test, i.e. have a flammability rating of V-0, if the p(FTP) value is above 0.9. A value below 0.9 means that the composition does not have a V-0 rating. Such composition can depending on the value have either a V-1 or V-2 rating. The calculations for determining the values are well known in the art.

Table 3 shows the flammability data (V-0 test) from Example 1 in Table 1.

TABLE 3

| p(FTP) | | 0.99 | | | |
|---|---|---|---|---|---|
| Set | Burn | 1 | 2 | 3 | 4 | 5 |
| 1 | 1st | 1.0 | 1.0 | 2.6 | 1.3 | 1.1 |
|   | 2nd | 1.6 | 3.4 | 3.8 | 2.6 | 2.5 |
| 2 | 1st | 1.0 | 2.2 | 1.0 | 1.1 | 1.5 |
|   | 2nd | 2.4 | 3.4 | 2.5 | 3.0 | 1.6 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.4 | 0.6 | 2.0 | 0.9 | 0 |
| 2nd | 2.7 | 0.7 | | | |

Table 4 shows the flammability data (V-0 test) from Example 2 in Table 1.

TABLE 4

| p(FTP) | | 1 | | | |
|---|---|---|---|---|---|
| Set | Burn | 1 | 2 | 3 | 4 | 5 |
| 1 | 1st | 1.0 | 2.6 | 2.2 | 1.1 | 1.0 |
|   | 2nd | 2.0 | 2.3 | 3.4 | 2.3 | 2.2 |
| 2 | 1st | 1.0 | 1.1 | 1.0 | 1.1 | 1.0 |
|   | 2nd | 2.2 | 1.5 | 2.1 | 2.4 | 1.6 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.3 | 0.6 | 1.8 | 0.7 | 0 |
| 2nd | 2.2 | 0.5 | | | |

Table 5 shows the flammability data (V-0 test) from Example 3 in Table 1.

TABLE 5

| p(FTP) | | 0.95 | | | | |
|---|---|---|---|---|---|---|
| Set | Burn | 1 | 2 | 3 | 4 | 5 |
| 1 | 1st | 1.0 | 1.1 | 1.2 | 1.1 | 1.2 |
|   | 2nd | 4.0 | 2.5 | 2.0 | 3.1 | 3.7 |
| 2 | 1st | 1.0 | 1.2 | 1.1 | 1.1 | 1.0 |
|   | 2nd | 2.4 | 2.2 | 7.2 | 3.1 | 7.6 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.1 | 0.1 | 2.4 | 2.0 | 0 |
| 2nd | 3.8 | 2.0 | | | |

Table 6 shows the flammability data (V-0 test) from Example 4 in Table 1.

TABLE 6

| p(FTP) | | 0.99 | | | | |
|---|---|---|---|---|---|---|
| Set | Burn | 1 | 2 | 3 | 4 | 5 |
| 1 | 1st | 1.0 | 1.1 | 1.0 | 1.5 | 1.1 |
|   | 2nd | 3.5 | 7.7 | 3.0 | 3.0 | 3.1 |
| 2 | 1st | 1.0 | 1.2 | 1.1 | 1.1 | 1.0 |
|   | 2nd | 2.3 | 3.8 | 2.5 | 1.8 | 3.1 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.1 | 0.2 | 2.2 | 1.6 | 0 |
| 2nd | 3.4 | 1.6 | | | |

Table 7 shows the flammability data (V-0 test) from Example 5 in Table 1.

TABLE 7

| p(FTP) | | 1 | | | | |
|---|---|---|---|---|---|---|
| Set | Burn | 1 | 2 | 3 | 4 | 5 |
| 1 | 1st | 1.0 | 1.3 | 1.2 | 2.0 | 1.0 |
|   | 2nd | 2.1 | 1.7 | 1.7 | 1.3 | 1.9 |
| 2 | 1st | 1.1 | 1.3 | 1.0 | 1.7 | 1.1 |
|   | 2nd | 2.4 | 1.5 | 2.2 | 1.3 | 1.6 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.3 | 0.3 | 1.5 | 0.4 | 0 |
| 2nd | 1.8 | 0.4 | | | |

Table 8 shows the flammability data (V-0 test) from Example 6 in Table 1.

TABLE 8

| p(FTP) | | 1 | | | | |
|---|---|---|---|---|---|---|
| Set | Burn | 1 | 2 | 3 | 4 | 5 |
| 1 | 1st | 1.2 | 1.0 | 1.0 | 1.3 | 1.1 |
|   | 2nd | 1.4 | 1.4 | 2.8 | 1.6 | 1.5 |
| 2 | 1st | 1.0 | 1.3 | 1.0 | 1.0 | 1.2 |
|   | 2nd | 1.6 | 1.8 | 2.5 | 2.2 | 2.4 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.1 | 0.1 | 1.5 | 0.6 | 0 |
| 2nd | 1.9 | 0.5 | | | |

Table 9 shows the flammability data (V-0 test) from Comparative Example 1 in Table 2.

TABLE 9

| p(FTP) | | 0 | | | | |
|---|---|---|---|---|---|---|
| Set | Burn | 1 | 2 | 3 | 4 | 5 |
| 1 | 1st | 1.3 | 1.1 | 2.5 | 1.3 | 2.5 |
|   | 2nd | 3.5 | 1.2 | 3.9 | 1.7 | 1.0 |
| 2 | 1st | 2.3 | 1.6 | 1.3 | 2.4 | 1.8 |
|   | 2nd | 5.8 | 4.6 | 2.0 | 2.5 | 2.3 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.8 | 0.6 | 2.3 | 1.3 | 5 |
| 2nd | 2.9 | 1.6 | | | |

Table 10 shows the flammability data (V-0 test) from Comparative Example 2 in Table 2.

TABLE 10

| p(FTP) | | 0.81 | | | | |
|---|---|---|---|---|---|---|
| Set | Burn | 1 | 2 | 3 | 4 | 5 |
| 1 | 1st | 1.0 | 2.4 | 1.1 | 1.1 | 1.1 |
|   | 2nd | 1.2 | 4.5 | 3.4 | 5.4 | 2.5 |
| 2 | 1st | 1.7 | 1.2 | 2.5 | 1.8 | 1.2 |
|   | 2nd | 2.2 | 6.8 | 8.3 | 2.6 | 4.3 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.5 | 0.6 | 2.8 | 2.1 | 0 |
| 2nd | 4.1 | 2.2 | | | |

Table 11 shows the flammability data (V-0 test) from Comparative Example 3 in Table 2.

TABLE 11

| p(FTP) | | 0.28 | | | | |
|---|---|---|---|---|---|---|
| Set | Burn | 1 | 2 | 3 | 4 | 5 |
| 1 | 1st | 1.1 | 1.1 | 1.1 | 1.1 | 1.1 |
|   | 2nd | 2.2 | 1.6 | 3.0 | 2.9 | 4.0 |
| 2 | 1st | 1.1 | 1.7 | 1.1 | 1.3 | 1.8 |
|   | 2nd | 1.5 | 2.6 | 1.7 | 1.8 | 4.4 |
| 3 | 1st | | | | | |
|   | 2nd | | | | | |
| 4 | 1st | | | | | |
|   | 2nd | | | | | |

TABLE 11-continued

|     | Avg | StDev | Avg | StDev | Drips |
|-----|-----|-------|-----|-------|-------|
| 1st | 1.3 | 0.3   | 1.9 | 1.0   | 2     |
| 2nd | 2.6 | 1.0   |     |       |       |

Table 12 shows the flammability data (V-0 test) from Comparative Example 4 in Table 2.

TABLE 12

| p(FTP) |      |     |     | 0   |     |     |
|--------|------|-----|-----|-----|-----|-----|
| Set    | Burn | 1   | 2   | 3   | 4   | 5   |
| 1      | 1st  | 1.1 | 1.1 | 1.1 | 1.0 | 1.0 |
|        | 2nd  | 2.6 | 2.3 | 1.2 | 1.7 | 1.1 |
| 2      | 1st  | 1.0 | 1.0 | 1.1 | 1.1 | 1.5 |
|        | 2nd  | 1.4 | 3.5 | 7.3 | 3.1 | 2.6 |
| 3      | 1st  |     |     |     |     |     |
|        | 2nd  |     |     |     |     |     |
| 4      | 1st  |     |     |     |     |     |
|        | 2nd  |     |     |     |     |     |

|     | Avg | StDev | Avg | StDev | Drips |
|-----|-----|-------|-----|-------|-------|
| 1st | 1.1 | 0.1   | 1.9 | 1.5   | 9     |
| 2nd | 2.7 | 1.8   |     |       |       |

Table 13 shows the flammability data (V-0 test) from Comparative Example 5 in Table 2.

TABLE 13

| p(FTP) |      |      |     | 0.06        |     |     |
|--------|------|------|-----|-------------|-----|-----|
| Set    | Burn | 1    | 2   | 3           | 4   | 5   |
| 1      | 1st  | 3.1  | 2.9 | 5.1         | 1.8 | 1.7 |
|        | 2nd  | 10.6 | 4.3 | 8.8         | 6.9 | 6.2 |
| 2      | 1st  | 1.8  | 5.6 | 1.4         | 4.3 | 7.2 |
|        | 2nd  | 5.7  | 7.5 | 8.3         | 9.3 | 9.9 |
| 3      | 1st  |      |     | delamination |     |     |
|        | 2nd  |      |     |             |     |     |
| 4      | 1st  |      |     |             |     |     |
|        | 2nd  |      |     |             |     |     |

|     | Avg | StDev | Avg | StDev | Drips |
|-----|-----|-------|-----|-------|-------|
| 1st | 3.5 | 2.0   | 5.6 | 2.9   | 0     |
| 2nd | 7.8 | 2.0   |     |       |       |

Table 14 shows the flammability data (V-0 test) from Comparative Example 6 in Table 2.

TABLE 14

| p(FTP) |      |      |      | 0     |      |       |
|--------|------|------|------|-------|------|-------|
| Set    | Burn | 1    | 2    | 3     | 4    | 5     |
| 1      | 1st  | 31.3 | 93.6 | 3.9   | 8.5  | 12.5  |
|        | 2nd  | 81.0 | NO   | 97.7  | 88.1 | 104.2 |
| 2      | 1st  | 2nd plame test cannot be performed due to burning of clamp. | | | | |
|        | 2nd  |      |      |       |      |       |
| 3      | 1st  |      |      |       |      |       |
|        | 2nd  |      |      |       |      |       |
| 4      | 1st  |      |      |       |      |       |
|        | 2nd  |      |      |       |      |       |

|     | Avg  | StDev | Avg  | StDev | Drips |
|-----|------|-------|------|-------|-------|
| 1st | 30.0 | 37.1  | 57.9 | 42.7  | 5     |
| 2nd | 92.8 | 10.3  |      |       |       |

Table 15 shows the flammability data (V-0 test) from Comparative Example 7 in Table 2.

TABLE 15

| p(FTP) |      |     |      | 0     |      |      |
|--------|------|-----|------|-------|------|------|
| Set    | Burn | 1   | 2    | 3     | 4    | 5    |
| 1      | 1st  | 1.9 | 22.5 | 1.4   | 21.9 | 66.1 |
|        | 2nd  | 1.4 | 27.3 | 134.8 | 3.7  | 49.3 |
| 2      | 1st  |     |      |       |      |      |
|        | 2nd  |     |      |       |      |      |
| 3      | 1st  |     |      |       |      |      |
|        | 2nd  |     |      |       |      |      |
| 4      | 1st  |     |      |       |      |      |
|        | 2nd  |     |      |       |      |      |

|     | Avg  | StDev | Avg  | StDev | Drips |
|-----|------|-------|------|-------|-------|
| 1st | 22.8 | 26.3  | 33.0 | 41.9  | 5     |
| 2nd | 43.3 | 54.7  |      |       |       |

Table 17 shows the flammability data (V-0 test) from Comparative Example 8 in Table 2.

TABLE 16

| p(FTP) |      |      |      | 0    |      |      |
|--------|------|------|------|------|------|------|
| Set    | Burn | 1    | 2    | 3    | 4    | 5    |
| 1      | 1st  | 59.8 | 19.8 | 1.1  | 1.2  | 32.8 |
|        | 2nd  | 34.2 | 45.2 | 92.6 | 89.1 | 4.9  |
| 2      | 1st  |      |      |      |      |      |
|        | 2nd  |      |      |      |      |      |
| 3      | 1st  |      |      |      |      |      |
|        | 2nd  |      |      |      |      |      |
| 4      | 1st  |      |      |      |      |      |
|        | 2nd  |      |      |      |      |      |

|     | Avg  | StDev | Avg  | StDev | Drips |
|-----|------|-------|------|-------|-------|
| 1st | 22.9 | 24.6  | 38.1 | 33.8  | 5     |
| 2nd | 53.2 | 37.4  |      |       |       |

Table 17 shows the flammability data (V-0 test) from Comparative Example 9 in Table 2.

TABLE 17

| p(FTP) |      |     |     | 1   |     |     |
|--------|------|-----|-----|-----|-----|-----|
| Set    | Burn | 1   | 2   | 3   | 4   | 5   |
| 1      | 1st  | 1.1 | 1.0 | 1.0 | 1.0 | 1.0 |
|        | 2nd  | 1.3 | 1.3 | 2.0 | 2.0 | 1.4 |
| 2      | 1st  | 1.0 | 1.0 | 1.0 | 1.0 | 1.0 |
|        | 2nd  | 2.4 | 1.1 | 1.1 | 1.9 | 1.6 |
| 3      | 1st  |     |     |     |     |     |
|        | 2nd  |     |     |     |     |     |
| 4      | 1st  |     |     |     |     |     |
|        | 2nd  |     |     |     |     |     |

|     | Avg | StDev | Avg | StDev | Drips |
|-----|-----|-------|-----|-------|-------|
| 1st | 1.0 | 0.0   | 1.3 | 0.4   | 0     |
| 2nd | 1.6 | 0.4   |     |       |       |

Table 18 shows the flammability data (V-0 test) from Comparative Example 10 in Table 2.

TABLE 18

| p(FTP) | | 1 | | | | |
|---|---|---|---|---|---|---|
| Set | Burn | 1 | 2 | 3 | 4 | 5 |
| 1 | 1st | 1.1 | 1.1 | 1.1 | 1.0 | 1.0 |
|   | 2nd | 1.8 | 1.6 | 1.5 | 1.6 | 1.8 |
| 2 | 1st | 1.0 | 1.0 | 1.0 | 1.0 | 1.0 |
|   | 2nd | 1.5 | 1.5 | 1.3 | 1.3 | 1.4 |
| 3 | 1st | | | | | |
|   | 2nd | | | | | |
| 4 | 1st | | | | | |
|   | 2nd | | | | | |

| | Avg | StDev | Avg | StDev | Drips |
|---|---|---|---|---|---|
| 1st | 1.0 | 0.0 | 1.3 | 0.3 | 0 |
| 2nd | 1.5 | 0.2 | | | |

What is claimed is:

1. A composition comprising:
   (a) a polycarbonate-polysiloxane copolymer, wherein the siloxane is present in the copolymer in an amount of about 13% by weight to about 50% by weight, and wherein the siloxane is present in the composition in an amount of about 0.8% by weight to about 9% by weight;
   (b) a polycarbonate;
   (c) an anti-static agent in an amount of about 4% by weight to about 19% by weight; and
   (d) a flame retardant additive,
   wherein the composition has an anti-static property of a half-life of less than about 60 seconds, the composition has flammability rating of V-0, and the composition has a notched IZOD impact rating of at least 300 J/m.

2. The composition of claim 1, wherein the composition further comprises an anti-oxidant, a mold release agent, a filler or an anti-drip agent, or a mixture thereof.

3. The composition of claim 2, wherein the anti-drip agent comprises PTFE.

4. The composition of claim 2, wherein the anti-oxidant agent is present in an amount above 0% by weight to about 1.0% by weight of the composition.

5. The composition of claim 2, wherein the mold release agent is present in an amount above 0% by weight to about 5% by weight of the composition.

6. The composition of claim 2, wherein the filler is talc, mica, milled glass fiber, glass fiber, glass flakes, glass beads, wollastonite, whiskers, carbon fiber, carbon powder, or milled carbon fiber, or a combination thereof.

7. The composition of claim 2, wherein the filler is present in an amount above 0% by weight to about 50% by weight of the composition.

8. The composition of claim 1, wherein the polycarbonate-polysiloxane copolymer comprises

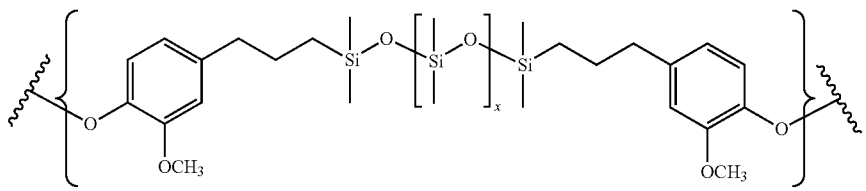

wherein x is from about 40 to about 60.

9. The composition of claim 1, wherein the polycarbonate comprises an aromatic polycarbon having the formula:

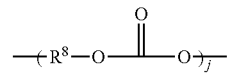

wherein each $R^8$ independently is aryl, heteroaryl, aliphatic, or alicyclic, wherein at least 60% of the total number of $R^8$ groups are aromatic; and
wherein j is at least 2.

10. The composition of claim 1, wherein the flame retardant additive is an aromatic phosphate compound of the formula:

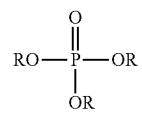

wherein each R is independently alkyl, cycloalkyl, aryl, alkyl substituted aryl, halogen substituted aryl, aryl substituted alkyl, or halogen.

11. The composition of claim 1, wherein the flame retardant additive is an- aromatic-phosphate, and phenyl bis(dodecyl) phosphate, phenyl bis(neopentyl) phosphate, phenyl bis (3,5,5-trimethylhexyl) phosphate, ethyl diphenyl phosphate, 2-ethylhexyl di(p-tolyl) phosphate, bis(2-ethylhexyl) p-tolyl phosphate, tritolyl phosphate, bis(2-ethylhexyl) phenyl phosphate, tri(nonylphenyl) phosphate, bis(dodecyl) p-tolyl phosphate, tricresyl phosphate, triphenyl phosphate, dibutyl phenyl phosphate, 2-chloroethyl diphenyl phosphate, p-tolyl bis (2,5,5'-trimethylhexyl) phosphate, 2-ethylhexyl diphenyl phosphate, or a combination thereof.

12. The composition of claim 1, wherein the flame retardant additive is resorcinol bis(diphenyl phosphate), bisphenol A bis(diphenyl phosphate), N,N'-bis[di-(2,6-xylyl)phosphoryl]-piperazine, or a combination thereof.

13. The composition of claim 1, wherein the composition has an anti-static property of a half-life of less than 10 seconds.

14. An article of manufacture comprising the composition of claim 1.

15. The article of manufacture of claim 14, wherein the article of manufacture is a housing or internal part for a TV, notebook, laptop, personal computer (PC), cellular phone, telephone, tablet, copier, printer, projector, automated teller machine (ATM) or advanced media data storage, memory device, air conditioner, vacuum cleaner, game machine, or electric tool.

16. A method of manufacturing a composition comprising extruding a mixture of:
   (a) a polycarbonate-polysiloxane copolymer, wherein the siloxane is present in the copolymer in an amount of about 13% by weight to about 50% by weight, and wherein the siloxane is present in the composition in an amount of about 0.8% by weight to about 9% by weight;
(b) a polycarbonate;
(c) an anti-static agent in an amount of about 4% by weight to about 19% by weight; and
(d) a flame retardant additive
wherein the composition has an anti-static property of a half-life of less than 60 seconds, the composition has flammability rating of V-0, and the composition has a notched IZOD impact rating of at least 300 J/m.

* * * * *